United States Patent
Hochgesang et al.

(10) Patent No.: US 7,098,270 B2
(45) Date of Patent: Aug. 29, 2006

(54) FLUOROELASTOMER COMPOSITION

(75) Inventors: Paul J. Hochgesang, Ann Arbor, MI (US); James W. Jacks, Warwick, NY (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 246 days.

(21) Appl. No.: 10/238,425

(22) Filed: Sep. 10, 2002

(65) Prior Publication Data

US 2004/0048983 A1 Mar. 11, 2004

(51) Int. Cl.
*C08F 8/00* (2006.01)
*C08L 27/12* (2006.01)

(52) U.S. Cl. .................. 525/192; 525/194; 525/197; 525/198; 525/199; 525/200

(58) Field of Classification Search ................ 525/192, 525/194, 197, 198, 199, 200
See application file for complete search history.

(56) References Cited

U.S. PATENT DOCUMENTS

| | | | | |
|---|---|---|---|---|
| 4,713,418 A | * | 12/1987 | Logothetis et al. | 525/200 |
| 5,430,103 A | * | 7/1995 | Ohata et al. | 525/194 |
| 6,664,338 B1 | * | 12/2003 | Staccione et al. | 525/326.3 |
| 6,812,294 B1 | | 11/2004 | Hochgesang | |
| 6,852,805 B1 | | 2/2005 | Hochgesang | |
| 2002/0099142 A1 | | 7/2002 | Faulkner | |

FOREIGN PATENT DOCUMENTS

| | | |
|---|---|---|
| EP | 0 132 834 | 2/1985 |
| EP | 0 824 120 | 2/1998 |
| JP | 10 139970 | 6/1996 |
| JP | 09 077697 | 3/1997 |
| JP | 09 208751 | 8/1997 |
| WO | WO 95/15359 | 6/1995 |

OTHER PUBLICATIONS

European Search Report, Jan. 30, 2004.

* cited by examiner

*Primary Examiner*—Nathan M. Nutter
(74) *Attorney, Agent, or Firm*—Ronald W. Wangerow; A. Michael Tucker

(57) ABSTRACT

A fluoroelastomer composition contains a peroxide-curable solid fluoroelastomer and a peroxide curative agent combined therewith, and, a bisphenol-curable liquid fluoroelastomer and a bisphenol curative agent combined therewith. The solid fluoroelastomer/peroxide curative when combined with the liquid fluoroelastomer/bisphenol curative results in a composition exhibiting improved polymeric properties including improved flowability at room temperature and improved fluid resistance and sealability at a wide range of temperatures.

88 Claims, 8 Drawing Sheets

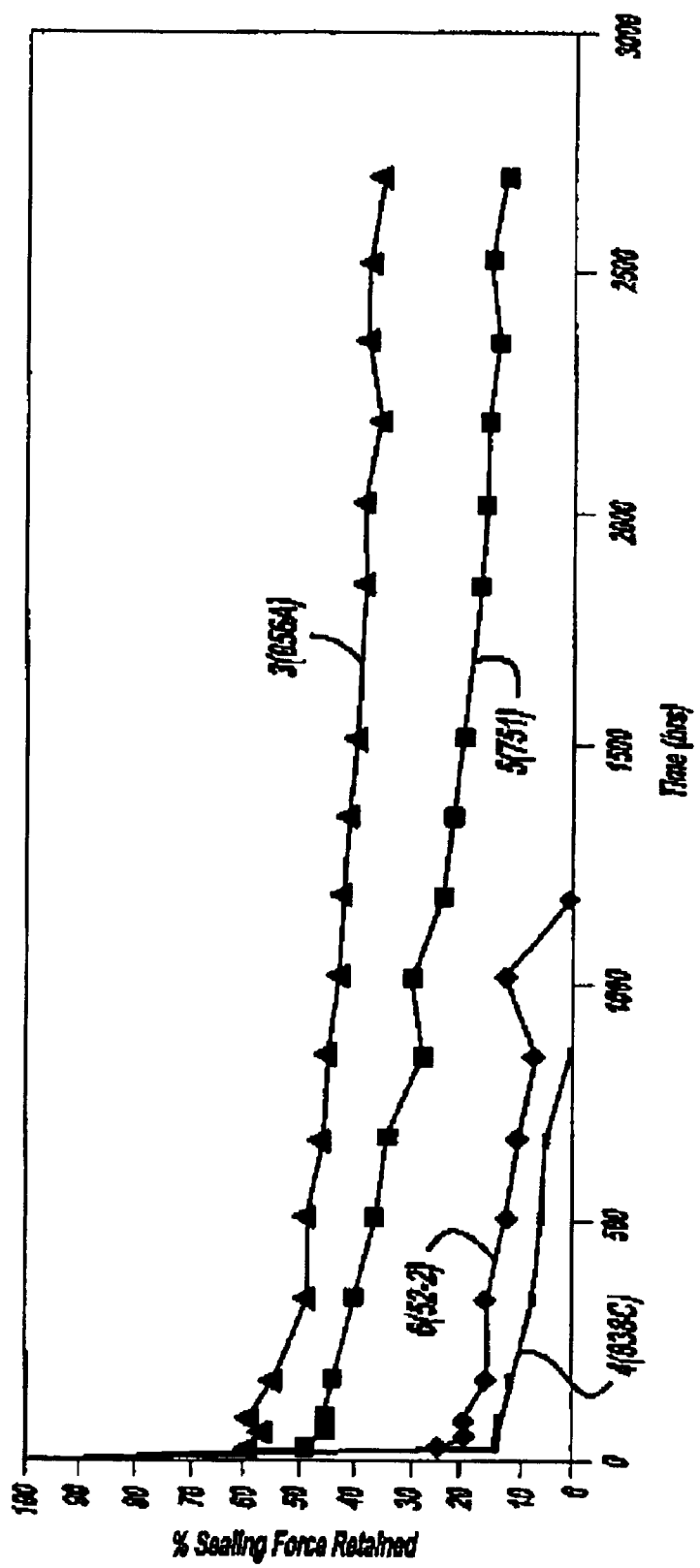

FLUOROELASTOMER COMPOSITION

FIELD OF THE INVENTION

The present invention relates to an elastomer composition. More particularly, it relates to a fluoroelastomer composition that is easily processed because of improved flow properties. Specifically, the compositions of the present invention are a combination of liquid fluoroelastomeric compounds and high-consistency fluoroelastomeric rubber with mixed cure systems and therefore facilitate improved flowability through various processes. Other advantages are also described below.

BACKGROUND OF THE INVENTION

Various fluoroelastomer compositions are known for use as seals, gaskets, or other rubber articles. Exemplary compositions are described in U.S. Pat. Nos. 6,221,971, 4,603,175, and 4,048,261, all incorporated herein by reference. In certain compositions, the poor or less-than-optimum flowability of the composition complicates the use of the polymeric composition in state-of-the-art processes, including injection molding, compression molding, and transfer molding.

Stated another way, the cure rate of the fluoroelastomer compositions at typical curing temperature must be inhibited or prolonged to facilitate optimum flow or viscosity of the composition during processing. By prolonging the cure rate, the fluoroelastomer composition remains flowable throughout processing and therefore, premature hardening or curing of the polymer is prevented.

Recent United States EPA requirements require improvements in partial zero emission values (EPA-PZEV) and low evaporative volatiles (LEV II). Known sealants such as silicone that exhibit higher relative permeability must be reconsidered for use in certain environments. California currently regulates the seals of an automotive engine under the Sealed Housing for Evaporative Determination (S.H.E.D.) test. The automobile is subjected to various temperature extremes during a three-day period while the ambient environment is monitored for its volatile organic concentration (VOCs). The range will be anywhere from 3.5 milligrams per vehicle per three days. Silicone seals are more permeable than fluoroelastomer seals and will not be good candidates under the new EPA requirements.

Silicone is currently favored in the seal industry because it is easily processed and has good heat resistance. Silicone also has generally good temperature properties. The seal may lose dimensional stability and swell up to 40% greater in volume thereby cracking the part interface (e.g. a cam cover) associated therewith.

Polyurethane is also known for its use as a seal. However, polyurethane begins to break down at 220° F. In general, the engineering preference is a seal maintaining its integrity to at least 300° F.

Many known fluoroelastomeric compositions simply do not exhibit preferable flow properties. Other compositions may exhibit favorable flow properties but lack other desirable properties. For example, certain compositions may not provide suitable oil resistance, water resistance, ozone resistance, high or low temperature resistance, tensile strength, elongation, and/or compression set, for example.

It would therefore be an improvement in the art to provide fluoroelastomeric compositions that exhibit as many of the desirable properties as possible while still providing enhanced flowability and processing.

SUMMARY OF THE INVENTION

In accordance with the present invention, the above-referenced concerns are resolved by fluoroelastomeric compositions that include a peroxide-curable solid fluoroelastomer gum combined with a peroxide curative agent, mixed with a bisphenol-curable liquid fluoroelastomer and a bisphenol curative agent. Not only are the flow properties enhanced, but many of the compositions exhibit one or more other optimum properties in conjunction therewith.

In general, the following constituents or their equivalents are provided per 100 parts of a peroxide curable solid fluoroelastomer: 0.1–25 parts of a peroxide curative; 0.1–200 parts of a bisphenol-curable liquid fluoroelastomer; 0.1–25 parts of magnesium oxide; 0.1–25 parts of a bisphenol curative; 0.1–50 parts of carbon black; and 0.1–25 parts of calcium hydroxide.

A more preferred embodiment contains 0.1–20 parts of a peroxide curative; 0.1–120 parts of a bisphenol-curable liquid fluoroelastomer; 0.1–20 parts of magnesium oxide; 0.1–20 parts of a bisphenol curative; 0.1–10 parts of carbon black; and 0.1–20 parts of calcium hydroxide per 100 parts of a solid peroxide curable fluoroelastomer.

An even more preferred embodiment contains about 2.0 parts of a peroxide curative; 12.9 parts of a bisphenol-curable liquid fluoroelastomer; 1.55 parts of magnesium oxide; 1.55 parts of a bisphenol curative; 2.58 parts of carbon black; and 1.55 parts of calcium hydroxide per 100 parts of a solid peroxide curable fluoroelastomer.

BRIEF DESCRIPTION OF THE FIGURES

FIG. 8 illustrates the improved CSR effect of adding a liquid fluoroelastomer to a solid fluoroelastomer, in accordance with the present invention.

DESCRIPTION OF THE PREFERRED EMBODIMENTS

Figure 1:
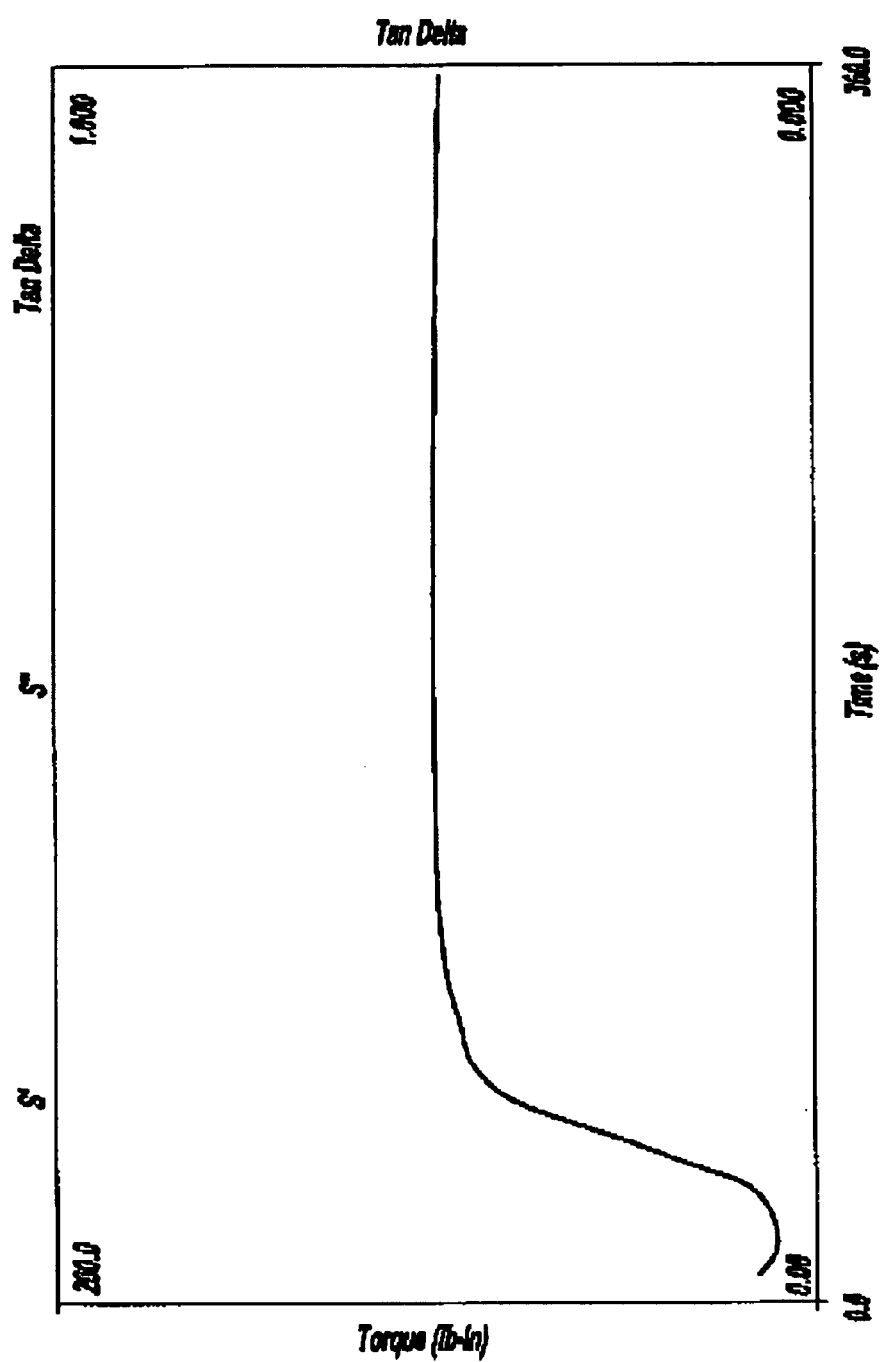
FIG. 1 shows a cure curve for Example 3.

The fluoroelastomeric compositions of the present invention when compared to other state-of-the-art fluoroelastomeric compositions exhibit improved flow properties without sacrificing other advantageous properties particular to a given composition.

A first fluoroelastomer composition is a solid gum containing vinylidene difluoride with at least one other fluorinated comonomer capable of forming an elastomeric composition. Such comonomers include perfluoroalkylvinyl ethers such as perfluoromethylvinyl ether (PFMVE), tetrafluoroethylene, chlorotrifluoroethylene, trifluoroethylene, vinyl fluoride, vinylidene difluoride ($VF_2$) hexafluoropropylene (HFP), perfluoro(alkoxyalkyl vinyl) ethers, ethylene, propylene, isobutylene, bromotrifluoroethylene, 4-bromo-3,3,4,4,- tetrafluorobutene-1, bromoperfluoro(ethyl vinyl) ether, and iodotetrafluorobutene. Preferred comonomers include tetrafluoroethylene, propylene, hexafluoropropylene, and perfluoro(methyl vinyl) ether. Preferred copolymers include vinylidene difluoride/tetrafluoroethylene/propylene terpolymers, vinylidene difluoride/tetrafluoroethylene/perfluoroalkylvinylether terpolymers, ethylene/tetrafluoroethylene/propylene terpolymers, tetrafluoroethylene/propylene dipolymers with a cure site monomer, vinylidene difluoride/hexafluoropropylene dipolymers, and vinylidene fluoride/hexafluoropropylene/tetrafluoroethylene terpolymers. A most preferred terpolymer contains vinylidene difluoride, tetrafluoroethylene, and perfluoromethylvinyl ether each at 1–99% by weight of the terpolymer combined with a cure site monomer.

The comonomer percentages that define amorphous, elastomeric compositions will differ depending on the particular comonomers that are present in the polymer chain. For example, in the case of VF$_2$/HFP dipolymers and VF$_2$/TFE/PFMVE terpolymers the elastomeric region encompasses compositions having 2–97 wt. % VF$_2$, 1–96 wt. % HFP, 1–96 wt. % TFE, and 1–96% PFMVE. In the case of VF$_2$/HFP dipolymers and vinylidene difluoride/hexafluoropropylene/tetrafluoroethylene (VF$_2$/HFP/TFE) terpolymers, the elastomeric region encompasses compositions having 20–70 wt. % VF$_2$, 20–60 wt. % HFP, and 0–40% TFE. In contrast, the elastomeric region for VF$_2$/TFE/P terpolymers encompasses compositions containing 2–90 wt. % VF$_2$, 5–65 wt. % TFE, and 5–50 wt. % propylene.

The solid vinylidene difluoride copolymers are generally prepared by free radical emulsion or suspension polymerization by methods known in the art. For example, the polymerizations may be carried out under steady-state conditions. Alternatively, batch, and semi-batch processes may be employed. The resulting emulsions are usually coagulated by addition of electrolytes. The precipitated polymer is washed with water and then dried, for example in an air oven, to produce a substantially dry fluoroelastomer gum. Many solid fluoroelastomer compositions of the present invention may of course be provided by manufacturers thereof. For example, a terpolymer in accordance with the present invention containing VF$_2$, TFE, and PFMVE can be provided by AUSIMONT S.p.A. of Italy, or other manufacturers known in the art.

The solid fluoroelastomer gum is combined with a peroxide curing system or curative that generates free radicals at curing temperatures. Dialkyl peroxides that decompose above 50° C. are especially preferred. In many cases one will prefer to use a di-t-butylperoxide having a tertiary carbon atom attached to a peroxy oxygen. Among the most useful are 2,5-dimethyl-2,5-di(t-butylperoxy)-3-hexyne. Other peroxides can be selected from such compounds as dicumyl peroxide, dibenzoyl peroxide, t-butyl perbenzoate, and di[1,3-dimethyl-3-t-butylperoxy)butyl]carbonate. The peroxide component of the cure system is generally employed in an amount of 0.2–5.0 parts per 100 parts fluoroelastomer.

Another material that may be blended with the composition is a coagent composed of a polyunsaturated compound that is capable of cooperating with the peroxide to provide a useful cure. Suitable coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N'N'-tetraallyl terephthalamide; N,N,N',N'-tetraallyl malonamide; trivinyl isocyanurate: 2,4,6-trivinylmethyltrisiloxane; and tri(5-norbornene-2-methylene)cyanurate. The coagents are generally added in amounts of about 0.5–10 percent by weight of the copolymer, preferably 1–5 percent by weight.

Peroxide curing agents are added to the fluoroelastomer at temperatures below that at which significant amounts of crosslinks are formed, usually at temperatures of 80° C.–120° C.

A second liquid fluoroelastomer composition is a fluoroelastomer having an average molecular weight of from 500 to 20,000, preferably from 500 to 10,000 and is liquid at room temperature. Specific examples of the liquid fluoroelastomer are vinylidene difluoride/hexafluoropropylene elastomers, vinylidene difluoride/hexafluoropropylene/tetrafluoroethylene elastomers, fluorophosphazene elastomers and oletine-containing fluoroelastomers, each of which has a molecular weight in the above range.

The second liquid fluoroelastomer is combined with a bisphenol curative of the formula

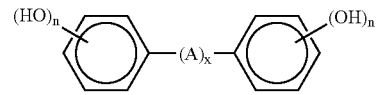

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Phenolate salts are also active crosslinking agents, such as the dipotassium salt of bisphenol AF, or, a salt formed from bisphenol AF and/or benzyltriphenylphosphonium. Preferred polyhydroxy compounds include hexa fluoroisopropylidene-bis(4-hydroxybenzene) (i.e. bisphenol AF); benzyltriphenylphosphonium, 4,4'-dihydroxydiphenyl sulfone; benzophenone; diaminobisphenol AF, and mixtures thereof. Referring to the bisphenol formula shown above, when A is alkylene, it can be for example methylene, ethylene, chloroethylene, fluoroethylene, difluoroethylene, propylene, isopropylidene, tributylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methyphenylene, dimethylphenylene, 1,4-naphthylene, 3-fluoro-1,4-naphthylene, and 2,6-naphthylene.

A weight ratio of the high-consistency fluoroelastomer and the liquid fluoroelastomer is preferably from 99:1 to 20:80, more preferably from 95:5 to 30:70.

In addition, other additives, commonly used in elastomer compounding and processing, may be added. Addition may take place before addition of the curative, simultaneously with it, or following the addition of the curative. Typical additives include fillers, plasticizers, processing aids, antioxidants, pigments, and the like. The amount of such ingredients added will depend on the particular uses for determined for the cured compositions. Fillers, such as carbon black, clays, barium sulfate, calcium carbonate, magnesium silicate, and fluoropolymers are generally added in amounts of from 5–100 parts by weight per 100 parts of solid fluoroelastomer. The amount of plasticizer used is generally 0.5–5.0 parts by weight per 100 parts solid fluoroelastomer. Typical plasticizers include esters, such as dioctyl phthalate and dibutyl sebacate. Processing aids are generally used in amounts of from 0.1–2.0 parts by weight per 100 parts solid fluoroelastomer. Suitable processing aids include octadecylamine, tetramethylene sulfone, p-chlorophenyl sulfone, and waxes, for example, carnauba wax, that aid in the processing of the compositions.

A preferred embodiment contains: 1) 100 parts of a solid peroxide-curable fluoroelastomer terpolymer containing vinylidene difluoride, tetrafluoroethylene, and perfluoromethylvinyl ether obtainable for example, from AUSIMONT S.p.H. of Italy, or from DUPONT DOW ELASTOMERS under the tradename VITON®, for example; 2) 12.9 parts of a liquid bisphenol-curable fluoroelastomer copolymer containing vinylidene difluoride and hexafluoropropylene obtainable for example from DAIKIN INDUSTRIES, LTD. of Osaka, Japan; 3) 2.58 parts of a composition containing bisphenol AF at 0–90% and/or benzyltriphenylphosphonium at 10–100% as a bisphenol curative; and 4) 2.0 parts of 2,5-dimethyl-2,5-di(t-butylperoxy)-3-hexyne as a peroxide curative.

In general, the following constituents or their equivalents are provided per 100 parts of a peroxide curable solid fluoroelastomer: 0.1–25 parts of a peroxide curative; 0.1–200 parts of a bisphenol-curable liquid fluoroelastomer; 0.1–25 parts of magnesium oxide; 0.1–25 parts of a bisphenol curative; 0.1–50 parts of carbon black; and 0.1–25 parts of calcium hydroxide.

A more preferred embodiment contains 0.1–20 parts of a peroxide curative; 0.1–120 parts of a bisphenol-curable liquid fluoroelastomer; 0.1–20 parts of magnesium oxide; 0.1–20 parts of a bisphenol curative; 0.1–10 parts of carbon black; and 0.1–20 parts of calcium hydroxide per 100 parts of a solid peroxide curable fluoroelastomer.

An even more preferred embodiment contains about 2.0 parts of a peroxide curative; 12.9 parts of a bisphenol-curable liquid fluoroelastomer; 1.55 parts of magnesium oxide; 1.55 parts of a bisphenol curative; 2.58 parts of carbon black; and 1.55 parts of calcium hydroxide per 100 parts of a solid peroxide curable fluoroelastomer.

The invention is further illustrated by the following examples. In certain examples, the compositions reflect various combinations of the following mixtures:

058B
(1) 100 parts of a solid fluoroelastomer containing vinylidine difluoride, tetrafluoroethylene, perfluoromethylvinylether, each comonomer provided at 1–98 mol % (TECNOFLON® PL 958 provided by AUSIMONT S.p.A. of Italy);
(2) 30 parts of ground bituminous coal (AUSTIN BLACK® provided by COAL FILLERS INCORPORATED of Buefield, Va.);
(3) 2.5 parts of triallylisocyanurate (DIAK-7 or TAIC provided by DUPONT DOW ELASTOMERS L.L.C. of Wilmington, Del.);
(4) 0.5 parts of silicone-organic compounds combined with silica (STRUKTOL WS 280 provided by SCHILL & SEILACHER (GmbH & Co.) of Hamburg, Germany);
(5) 2.0 parts of zinc oxide
(6) 2.0 parts of 2,5-dimethyl-2,5-di(t-butylperoxy)-3-hexyne (VAROX® 130-XL provided by R.T. VANDERBILT COMPANY, INC. of Norwalk, Conn.);

026A
(1) 100 parts of a liquid fluoroelastomer containing vinylidene difluoride and hexafluoropropylene, each comonomer provided at 1–99 mol % (DAI-EL® G-101L provided by DAIKIN INDUSTRIES, LTD. CHEMICAL DIVISION of Osaka, Japan);
(2) 12 parts of magnesium oxide
(3) 12 parts of a bisphenol curative containing 0–90% bisphenol AF and 10–100% benzyitriphenylphosphonium (VITON® VC-50 provided by DUPONT DOW ELASTOMERS L.L.C. of Wilmington, Del.);
(4) 20 parts of carbon black (N-990 ULTRA-PURE FLOFORM provided by CANCARB LIMITED of Medicine Hat, Alberta, Canada);
(5) 12 parts of calcium hydroxide.

038C
(1) 100 parts of a solid fluoroelastomer containing tetrafluoroethylene, perfluoro(methylvinylether), ethylene, and bromotetrafluorobutylene (VITON® ETP900 provided by DUPONT DOW ELASTOMERS L.L.C. of Wilmington, Del.);
(2) 8 parts of ground bituminous coal (AUSTIN BLACK® provided by COAL FILLERS INCORPORATED of Buefield, Va.);
(3) 1.6 parts of triallylisocyanurate (DIAK-7 or TAIC provided by DUPONT DOW ELASTOMERS L.L.C. of Wilmington, Del.);
(4) 0.4 parts of silicone-organic compounds combined with silica (STRUKTOL WS 280 provided by SCHILL & SEILACHER (GmbH & Co.) of Hamburg, Germany);
(5) 1.6 parts of 2,5-dimethyl-2,5-di(t-butylperoxy)-hexane (VAROX® DBPH-50 provided by R.T. VANDERBILT COMPANY, INC. of Norwalk, Conn.);
(6) 4 parts of calcium oxide.
(7) 0.32 parts of 1,8-naphthalenediamine-N,N,N',N', tetramethyl 056A
(1) 100 parts of 058B; and
(2) 14.7 parts of 026A.

111B
(1) 100 parts of a solid fluoroelastomer containing vinylidine difluoride, tetrafluoroethylene, perfluoromethylvinylether, each comonomer provided at 1–98 mol % (TECNOFLON® PL 958 provided by AUSIMONT S.p.A. of Italy);
(2) 15 parts of ground bituminous coal (AUSTIN BLACK® provided by COAL FILLERS INCORPORATED of Buefield, Va.);
(3) 2.5 parts of triallylisocyanurate (DIAK-7 or TAIC provided by DUPONT DOW ELASTOMERS L.L.C. of Wilmington, Del.);
(4) 0.5 parts of silicone-organic compounds combined with silica (STRUKTOL WS 280 provided by SCHILL & SEILACHER (GmbH & Co.) of Hamburg, Germany);
(5) 2.0 parts of zinc oxide; (6) 2.0 parts of 2,5-dimethyl-2, 5-di(t-butylperoxy)-3-hexyne (VAROX® 130-XL provided by R.T. VANDERBILT COMPANY, INC. of Norwalk, Conn.);
(7) 12.9 parts of a liquid fluoroelastomer containing vinylidene difluoride and hexafluoropropylene, each comonomer provided at 1–99 mol % (DAI-EL® G-101 L provided by DAIKIN INDUSTRIES, LTD. CHEMICAL DIVISION of Osaka, Japan);
(8) 1.55 parts of magnesium oxide
(9) 1.55 parts of a bisphenol curative containing 0–90% bisphenol AF and 1 0–100% benzyltriphenylphosphonium (VITON® VC-50 provided by DUPONT DOW ELASTOMERS L.L.C. of Wilmington, Del.);
(10) 2.58 parts of carbon black (N-990 ULTRA-PURE FLOFORM provided by CANCARB LIMITED of Medicine Hat, Alberta, Canada);

(11) 1.55 parts of calcium hydroxide;
(12) 31.4 parts of calcium silicate (NYAD 400 provided by NYCO COMPANY of Calgary, Canada; and
(13) 5.6 parts of carbon graphite.

004A
(1) 100 parts of a solid fluoroelastomer containing vinylidine difluoride, tetrafluoroethylene, perfluoromethylvinylether, each comonomer provided at 1–98 mol % (TECNOFLON® PL 958 provided by AUSIMONT S.p.A. of Italy);
(2) 15 parts of ground bituminous coal (AUSTIN BLACK® provided by COAL FILLERS INCORPORATED of Buefield, Va.);
(3) 2.5 parts of triallylisocyanurate (DIAK-7 or TAIC provided by DUPONT DOW ELASTOMERS L.L.C. of Wilmington, Del.);
(4) 0.5 parts of silicone-organic compounds combined with silica (STRUKTOL WS 280 provided by SCHILL & SEILACHER (GmbH & Co.) of Hamburg, Germany);
(5) 2.0 parts of zinc oxide;
(6) 2.0 parts of 2,5-dimethyl-2,5-di(t-butylperoxy)-3-hexyne (VAROX® 130-XL provided by R.T. VANDERBILT COMPANY, INC. of Norwalk, Conn.);
(7) 21.0 parts of calcium silicate (NYAD 400 provided by NYCO COMPANY of Calgary, Canada; and
(8) 5.0 parts of carbon graphite.

017A
(1) 100 parts of a solid fluoroelastomer containing tetrafluoroethylene, perfluoro(methylvinylether), ethylene, and bromotetrafluorobutylene (VITON® ETP900 provided by DUPONT DOW ELASTOMERS L.L.C. of Wilmington, Del.);
(2) 2.0 parts of 2,5-dimethyl-2,5-di(t-butylperoxy)-hexane (VAROX® DBPH-50 provided by R.T. VANDERBILT COMPANY, INC. of Norwalk, Conn.);
(3) 3.0 parts of triallylisocyanurate (DIAK-7 or TAIC provided by DUPONT DOW ELASTOMERS L.L.C. of Wilmington, Del.);
4) 3.0 parts of zinc oxide;
(5) 5.0 parts of carbon black (N-990 ULTRA-PURE FLO-FORM provided by CANCARB LIMITED of Medicine Hat, Alberta, Canada);
(6) 6.0 parts of boron nitride;
(7) 10.0 parts of calcium silicate (NYAD 400 provided by NYCO COMPANY of Calgary, Canada;
(8) 5.0 parts of barium sulfate; and
(9) 0.5 parts of silicone-organic compounds combined with silica (STRUKTOL WS 280 provided by SCHILL & SEILACHER (GmbH & Co.) of Hamburg, Germany).

017B
(1) 90 parts of a solid fluoroelastomer containing tetrafluoroethylene, perfluoro(methylvinylether), ethylene, and bromotetrafluorobutylene (VITON® ETP900 provided by DUPONT DOW ELASTOMERS L.L.C. of Wilmington, Del.);
(2) 1.8 parts of 2,5-dimethyl-2,5-di(t-butylperoxy)-hexane (VAROX® DBPH-50 provided by R.T. VANDERBILT COMPANY, INC. of Norwalk, Conn.);
(3) 1.8 parts of triallylisocyanurate (DIAK-7 or TAIC provided by DUPONT DOW ELASTOMERS L.L.C. of Wilmington, Del.);
(4) 2.7 parts of zinc oxide;
(5) 10.0 parts of a liquid fluoroelastomer containing vinylidene difluoride and hexafluoropropylene, each comonomer provided at 1–99 mol % (DAI-EL® G-101L provided by DAIKIN INDUSTRIES, LTD. CHEMICAL DIVISION of Osaka, Japan);
(6) 1.2 parts of a bisphenol curative containing 0–90% bisphenol AF and 10–100% benzyltriphenylphosphonium (VITON® VC-50 provided by DUPONT DOW ELASTOMERS L.L.C. of Wilmington, Del.);
(7) 1.2 parts of magnesium oxide
(8) 1.2 parts of calcium hydroxide;
(9) 5.0 parts of carbon black (N-990 ULTRA-PURE FLO-FORM provided by CANCARB LIMITED of Medicine Hat, Alberta, Canada);
(10) 6.0 parts of boron nitride
(11) 10.0 parts of calcium silicate (NYAD 400 provided by NYCO COMPANY of Calgary, Canada;
(12) 5.0 parts of barium sulfate; and
(13) 0.5 parts of silicone-organic compounds combined with silica (STRUKTOL WS 280 provided by SCHILL & SEILACHER (GmbH & Co.) of Hamburg, Germany).

017C
(1) 80 parts of a solid fluoroelastomer containing tetrafluoroethylene, perfluoro(methylvinylether), ethylene, and bromotetrafluorobutylene (VITON® ETP900 provided by DUPONT DOW ELASTOMERS L.L.C. of Wilmington, Del.);
(2) 1.6 parts of 2,5-dimethyl-2,5-di(t-butylperoxy)-hexane (VAROX® DBPH-50 provided by R.T. VANDERBILT COMPANY, INC. of Norwalk, Conn.);
(3) 1.6 parts of triallylisocyanurate (DIAK-7 or TAIC provided by DUPONT DOW ELASTOMERS L.L.C. of Wilmington, Del.);
(4) 2.4 parts of zinc oxide;
(5) 20.0 parts of a liquid fluoroelastomer containing vinylidene difluoride and hexafluoropropylene, each comonomer provided at 1–99 mol % (DAI-EL® G-101L provided by DAIKIN INDUSTRIES, LTD. CHEMICAL DIVISION of Osaka, Japan);
(6) 2.4 parts of a bisphenol curative containing 0–90% bisphenol AF and 10–100% benzyltriphenylphosphonium (VITON® VC-50 provided by DUPONT DOW ELASTOMERS L.L.C. of Wilmington, Del.);
(7) 2.4 parts of magnesium oxide
(8) 2.4 parts of calcium hydroxide;
(9) 5.0 parts of carbon black (N-990 ULTRA-PURE FLO-FORM provided by CANCARB LIMITED of Medicine Hat, Alberta, Canada);
(10) 6.0 parts of boron nitride
(11) 10.0 parts of calcium silicate (NYAD 400 provided by NYCO COMPANY of Calgary, Canada;
(12) 5.0 parts of barium sulfate; and
(13) 0.5 parts of silicone-organic compounds combined with silica (STRUKTOL WS 280 provided by SCHILL & SEILACHER (GmbH & Co.) of Hamburg, Germany).

EXAMPLE 1

Dual Mixture Process

A fluoroelastomer composition in accordance with the present invention was prepared as follows. One hundred parts of a peroxide-curable solid fluoroelastomer gum containing vinylidene difluoride, tetrafluoroethylene, and perfluoromethylvinylether was placed in a Banbury mixer at room temperature and beaten until soft and fragmented into small particles. Ten to thirty parts of carbon black were added and mixed therein. One to five parts of a peroxide curative agent (e.g. VAROX 130-XL) were then mixed in. One to five parts of triallyl isocyanurate functioning as coagent were then added and mixed within the vessel for linking the materials therein. This constitutes the solid fluoroelastomeric composition.

Next, one hundred parts of a bisphenol-curable liquid fluoroelastomeric copolymer containing vinylidene difluoride and hexafluoropropylene respectively provided in a molar ratio of 1:99 to 99:1 were added to a second vessel at about room temperature. Seven to fifteen parts, preferably 12, of hexafluoroisopropylidene—bis(4-hydroxybenzene) (or bisphenol AF) were then mixed in as a bisphenol curative agent. Seven to fifteen parts of magnesium oxide were added to the second vessel and homogeneously mixed therein. One to five parts of additional processing additives were next mixed therein. This constitutes the liquid fluoroelastomeric composition.

The order of mixing of the above constituents in either vessel is not critical so long as they are thoroughly mixed to form respective homogeneous mixtures.

In general, the peroxide curative agent is added in an amount effective to cure the solid fluoroelastomer and the bisphenol curative agent is added in an amount effective to cure the liquid fluoroelastomer, and, the solid fluoroelastomer added with respect to the liquid fluoroelastomer is in a molar ratio range of 1:99 to 99:1 per 100 parts of total (liquid and solid) fluoroelastomer.

The solid and liquid fluoroelastomer compositions may then be combined and mixed as part of a first step of forming a seal or other article in the manufacturing process. Exemplary processes include injection molding and compression molding. Stated another way, the weight ratio of the solid fluoroelastomeric composition combined with respect to the liquid fluoroelastomeric composition is 1:99 to. 99:1 per 100 parts of total (liquid and solid fluoroelastomer compositions). One of ordinary skill will appreciate that the cure rates and relative torque or viscosities of the combined solid and liquid fluoroelastomer compositions can be altered by varying the compositions within this ratio range.

EXAMPLE 2

Batch Process

In contrast to Example 1, the solid and liquid fluoroelastomers may also be mixed as a single batch process at room temperature. 100 parts of a non-flowable polymer, or a solid fluoroelastomer, is added to a Banbury mixer and beaten until soft. A preferred terpolymer contains vinylidene difluoride/tetrafluoroethylene/perfluoromethylvinylether wherein each comononer is provided at 1–98 mol %. Ten to thirty parts of carbon black was added and mixed therein. One to five parts of a peroxide curative agent (e.g. VAROX 130-XL) were then mixed in. One to five parts of triallyl isocyanurate functioning as coagent were then added and mixed within the vessel for linking the materials therein. Seven to fifteen parts, preferably 12, of hexafluoroisopropylidene—bis(4-hydroxybenzene) (or bisphenol AF) were then mixed in as a bisphenol curative agent. Seven to fifteen parts of magnesium oxide were added and homogeneously mixed therein. One to five parts of additional processing additives were next mixed therein. Finally, 14.7 parts of a bisphenol-curable liquid fluoroelastomeric copolymer containing vinylidene difluoride and hexafluoropropylene respectively provided in a molar ratio of 1:99 to 99:1 was added and homogeneously mixed therein. In general, the constituents may be mixed in any order except for the addition of the liquid fluoroelastomer. In a batch process, the liquid fluoroelastomer should preferably be added last given the resultant optimum curative, sealant, and CSR properties.

A preferred ratio of the solid fluoroelastomer to the liquid fluoroelastomer is one hundred parts of solid fluoroelastomer composition for every ten to fifteen parts of liquid fluoroelastomer composition. Liquid compositions formed from mixing the solid and liquid fluoroelastomeric compositions in the batch process have a shelf life of about two to three months before curing begins. Thus, preforms including but not limited to sheets, strips, or biscuits may be stored for further processing in injection and compression molding processes for example. Additionally, the present liquid compositions may also be used in known transfer molding processes. Stated another way, compositions of the present invention formed as described in Example 1 or Example 2 may be cured very quickly at about 350° F., or, may be cured very slowly (e.g. two to three months) at temperatures ranging from room temperature and above. Thus, the time required to cure is a function of the temperature applied during the curing step. The present compositions are thus suitable for applications where a long cure time is desired, or, where a short cure time is obtained by heating.

EXAMPLE 3

Comparative Example

A mixture of 058B was mixed as described in Example 1. The mixture was cured in a Rubber Processing Analyzer (RPA) or rheometer at 350° F. for six minutes, and evaluated to determine the minimum and maximum torque over the curing period. The time for completion of 2% of the cure, TS2.00 was also determined. The curve shown in FIG. 1 indicates the minimum and maximum torque after mixing to be 9.35 lb-in and 100.75 lb-in, respectively. The TS2.00 is 24.1 seconds. In general, the longer the TS2.00 time, the better. This example indicates that state of the art solid fluoroelastomers must be in the tool and ready to be cured within about 24 seconds of the beginning of cure (generally conducted at about 350° F.), otherwise the part exhibits flow marks or flow lines that detract from the appearance and sometimes from the desired performance or fit. One use of the mixed fluoroelastomer, for example, is for gaskets and seals.

A seal formed by curing a mixture described herein resulted in the following properties as determined by a series of three batteries of tests:

| Properties | 1 | 2 | 3 | Mean | S.D. | Median |
|---|---|---|---|---|---|---|
| Tensile Strength (MPa) | 9.62 | 10.33 | 10.51 | 10.15 | 0.47 | 10.33 |
| Ultimate Elongation (%) | 204.6 | 229.4 | 243.1 | 225.7 | 19.5 | 229.4 |
| 10% Modulus (MPa) | .872 | .829 | .570 | .757 | .164 | .829 |
| 25% Modulus (MPa) | 1.711 | 1.691 | 1.437 | 1.613 | .153 | 1.691 |
| 50% Modulus (MPa) | 3.290 | 3.250 | 2.904 | 3.148 | .212 | 3.250 |
| 100% Modulus (MPa) | 6.398 | 6.353 | 6.094 | 6.282 | .164 | 6.353 |
| 200% Modulus (MPa) | 9.467 | 9.415 | 9.267 | 9.383 | .104 | 9.415 |

EXAMPLE 4

Comparative Example

A mixture of 150 parts of 058B and 7.5 parts of 026A was mixed as described in Example 1. The mixture was cured in a Rubber Processing Analyzer (RPA) or rheometer at 350°

Figure 2:
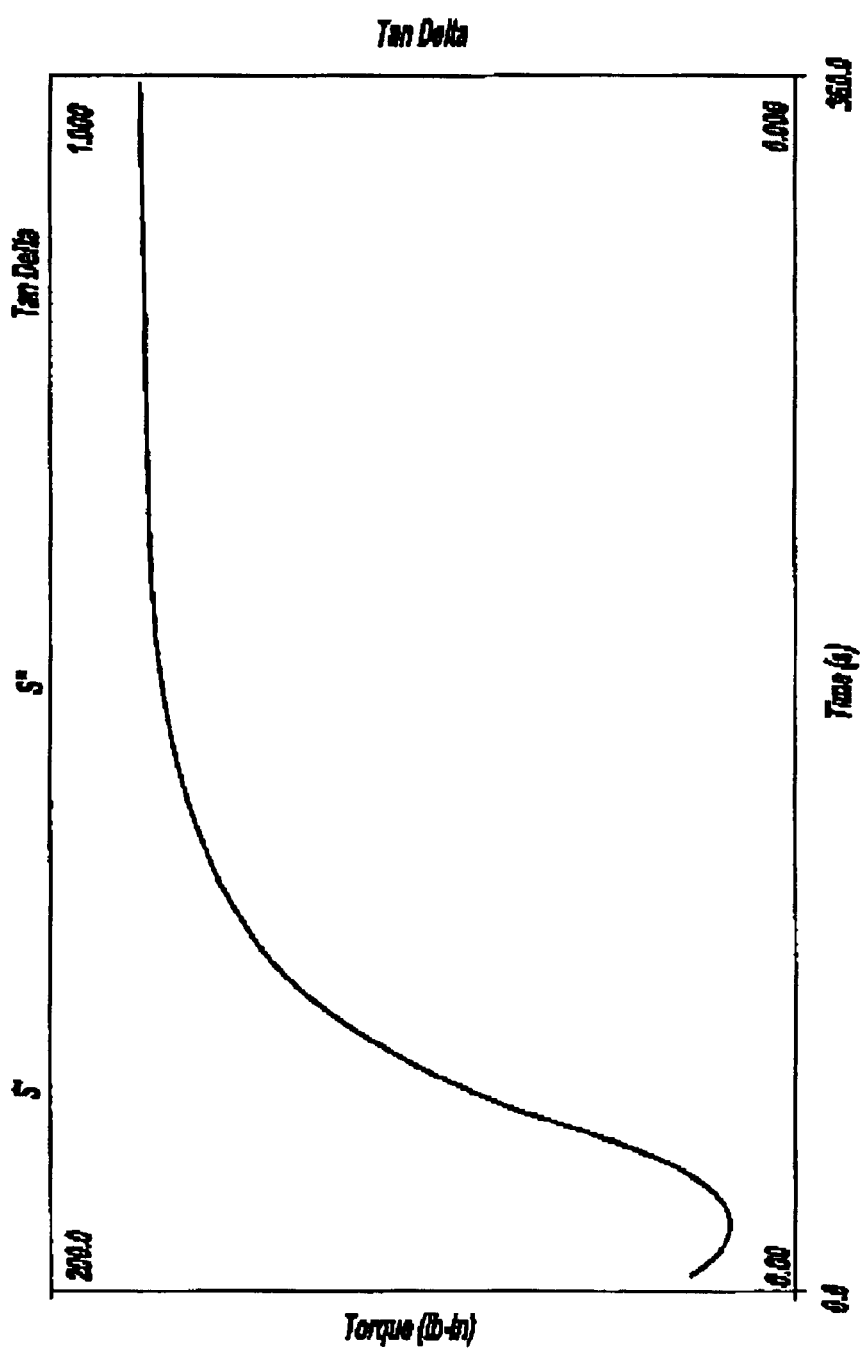
FIG. 2 shows a cure curve for Example 4.

F. for six minutes, and evaluated to determine the minimum and maximum torque over the curing period. The time for completion of 2% of the cure, TS2.00, was also determined. The curve shown in FIG. 2 indicates the minimum and maximum torque after mixing to be 7.46 lb-in and 89.83 lb-in, respectively. The TS2.00 is 28.9 seconds. As compared to the solid fluoroelastomer of Example 1, the processibility of the mixture is therefore improved because of the longer TS2.00 time. The maximum torque, although reduced, is still acceptable for certain design tolerances. One use of the mixed fluoroelastomer, for example, is for gaskets and seals.

A seal formed by curing a mixture described herein resulted in the following properties as determined by a series of three batteries of tests:

| Properties | 1 | 2 | 3 | Mean | S.D. | Median |
|---|---|---|---|---|---|---|
| Tensile Strength (MPa) | 9.29 | 9.21 | 10.28 | 9.59 | 0.59 | 9.29 |
| Ultimate Elongation (%) | 233.0 | 242.3 | 268.0 | 247.8 | 18.1 | 242.3 |
| 10% Modulus (MPa) | .815 | .670 | .763 | .750 | .074 | .763 |
| 25% Modulus (MPa) | 1.598 | 1.466 | 1.552 | 1.539 | .067 | 1.552 |
| 50% Modulus (MPa) | 3.025 | 2.803 | 2.946 | 2.925 | .112 | 2.946 |
| 100% Modulus (MPa) | 5.807 | 5.574 | 5.668 | 5.683 | .117 | 5.668 |
| 200% Modulus (MPa) | 8.402 | 8.134 | 8.190 | 8.242 | .141 | 8.190 |

EXAMPLE 5

Comparative Example

Figure 3:
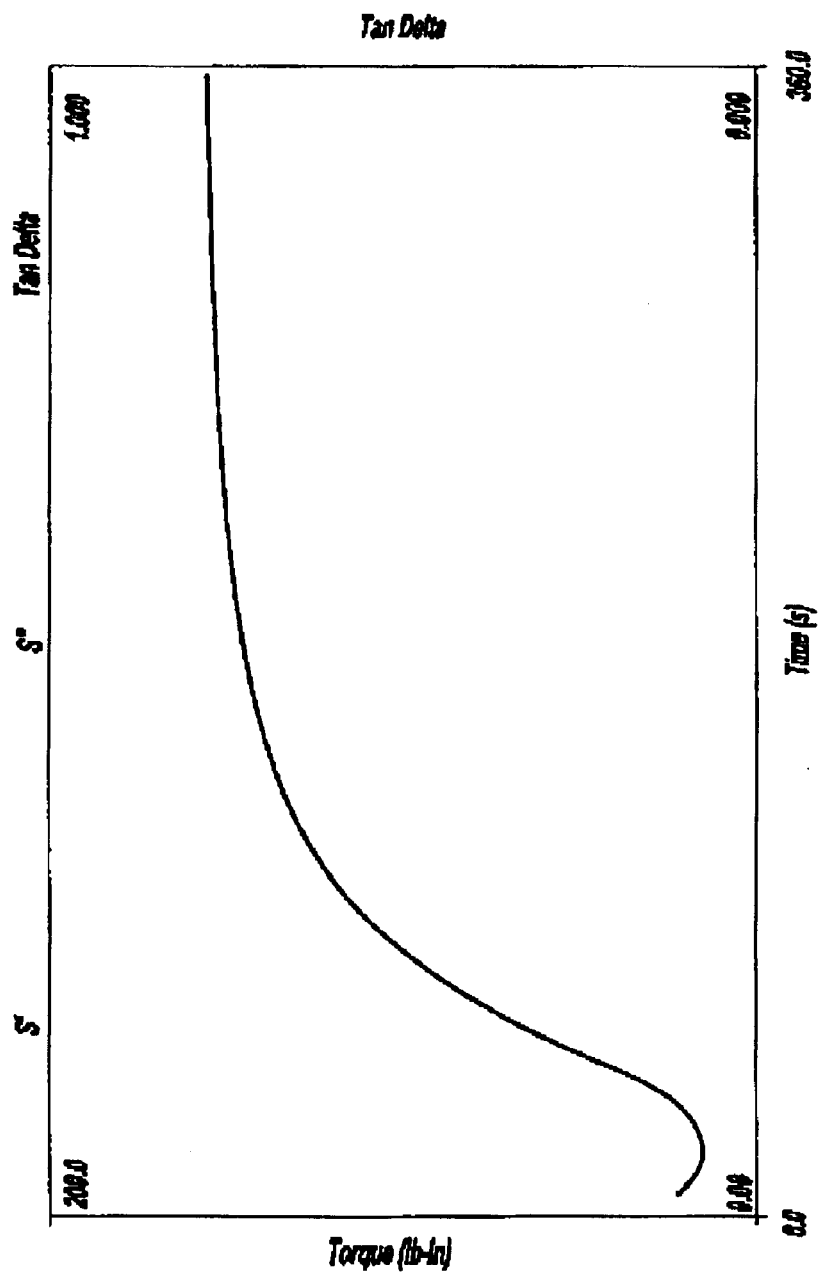
FIG. 3 shows a cure curve for Example 5.

A mixture of 150 parts of 058B and 15 parts of 026A was mixed as described in Example 1. The mixture was cured in a Rubber Processing Analyzer (RPA) or rheometer at 350° F. for six minutes, and evaluated to determine the minimum and maximum torque over the curing period. The time for completion of 2% of the cure, TS2.00, was also determined. The curve shown in FIG. 3 indicates the minimum and maximum torque after mixing to be 6.13 lb-in and 78.47 lb-in, respectively. The TS2.00 is 29.4 seconds. As compared to the solid fluoroelastomer of Example 1, the processing of the mixture is therefore improved because of the longer TS2.00 time. The maximum torque, although reduced, is still acceptable for certain design tolerances. One use of the mixed fluoroelastomer, for example, is for hoses.

A seal formed by curing a mixture described herein resulted in the following properties as determined by three batteries of tests:

| Properties | 1 | 2 | 3 | Mean | S.D. | Median |
|---|---|---|---|---|---|---|
| Tensile Strength (MPa) | 9.52 | 9.58 | 9.36 | 9.49 | 0.11 | 9.52 |
| Ultimate Elongation (%) | 218.3 | 215.7 | 213.0 | 215.7 | 2.7 | 215.7 |
| 10% Modulus (MPa) | .763 | .766 | .765 | .765 | .001 | .765 |
| 25% Modulus (MPa) | 1.531 | 1.516 | 1.525 | 1.524 | .008 | 1.525 |
| 50% Modulus (MPa) | 2.877 | 2.921 | 2.894 | 2.897 | .022 | 2.894 |
| 100% Modulus (MPa) | 6.029 | 6.139 | 6.018 | 6.062 | .067 | 6.029 |
| 200% Modulus (MPa) | 9.084 | 9.187 | 9.040 | 9.104 | .075 | 9.084 |

EXAMPLE 6

Comparative Example

Figure 4:
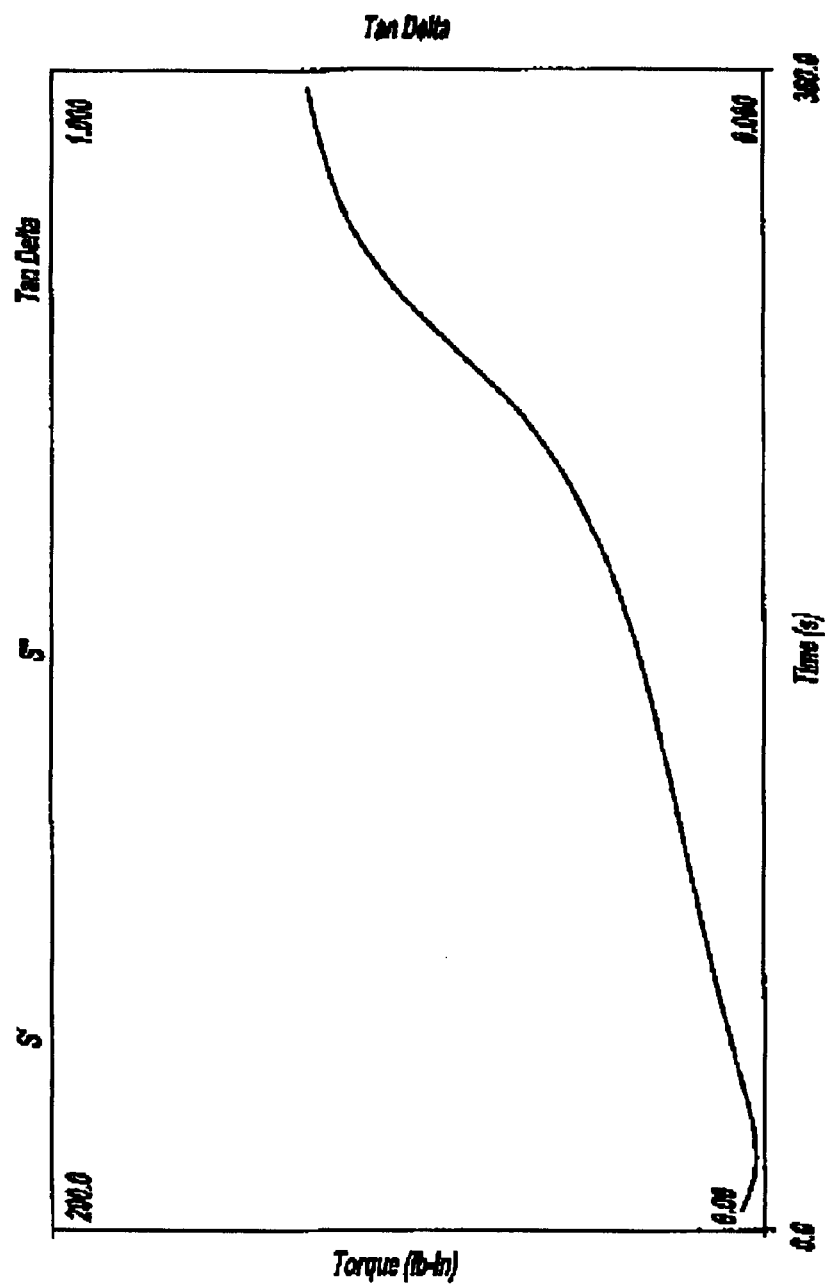
FIG. 4 shows a cure curve for Example 6.

A mixture of 100 parts of 058B and 50 parts of 026A was mixed as described in Example 1. The mixture was cured in a Rubber Processing Analyzer (RPA) rheometer at 350° F. for six minutes, and evaluated to determine the minimum and maximum torque over the curing period. The time for completion of 2% of the cure, TS2.00, was also determined. The curve shown in FIG. 4 indicates the minimum and maximum torque after mixing to be 1.63 lb-in and 66.28 lb-in, respectively. The TS2.00 is 46.2 seconds. As compared to the solid fluoroelastomer of Example 1, the processing of the mixture is therefore improved because of the longer TS2.00 time. The maximum torque, although reduced, is still acceptable for certain design tolerances. One use of the mixed fluoroelastomer, for example, is for thin gaskets having a width of less than 20 thousandths.

A seal formed by curing a mixture described herein resulted in the following properties as determined by a series of four batteries of tests:

| Properties | 1 | 2 | 3 | 4 | Mean | S.D. | Median |
|---|---|---|---|---|---|---|---|
| Tensile Strength (MPa) | 5.48 | 8.98 | 9.01 | 8.48 | 7.99 | 1.69 | 8.73 |
| Ultimate Elongation (%) | 83.0 | 142.7 | 147 | 125.59 | 124.5 | 29.2 | 134.1 |
| 10% Modulus (MPa) | .877 | .987 | .987 | 1.00 | .937 | .065 | .829 |
| 25% Modulus (MPa) | 1.769 | 2.006 | 1.913 | 1.97 | 1.914 | .104 | 1.941 |
| 50% Modulus (MPa) | 3.303 | 3.987 | 3.834 | 3.88 | 3.752 | .306 | 3.859 |
| 100% Modulus (MPa) | — | 7.619 | 7.483 | 7.48 | 7.527 | .079 | 7.483 |

EXAMPLE 7

Comparative Example

Figure 5:
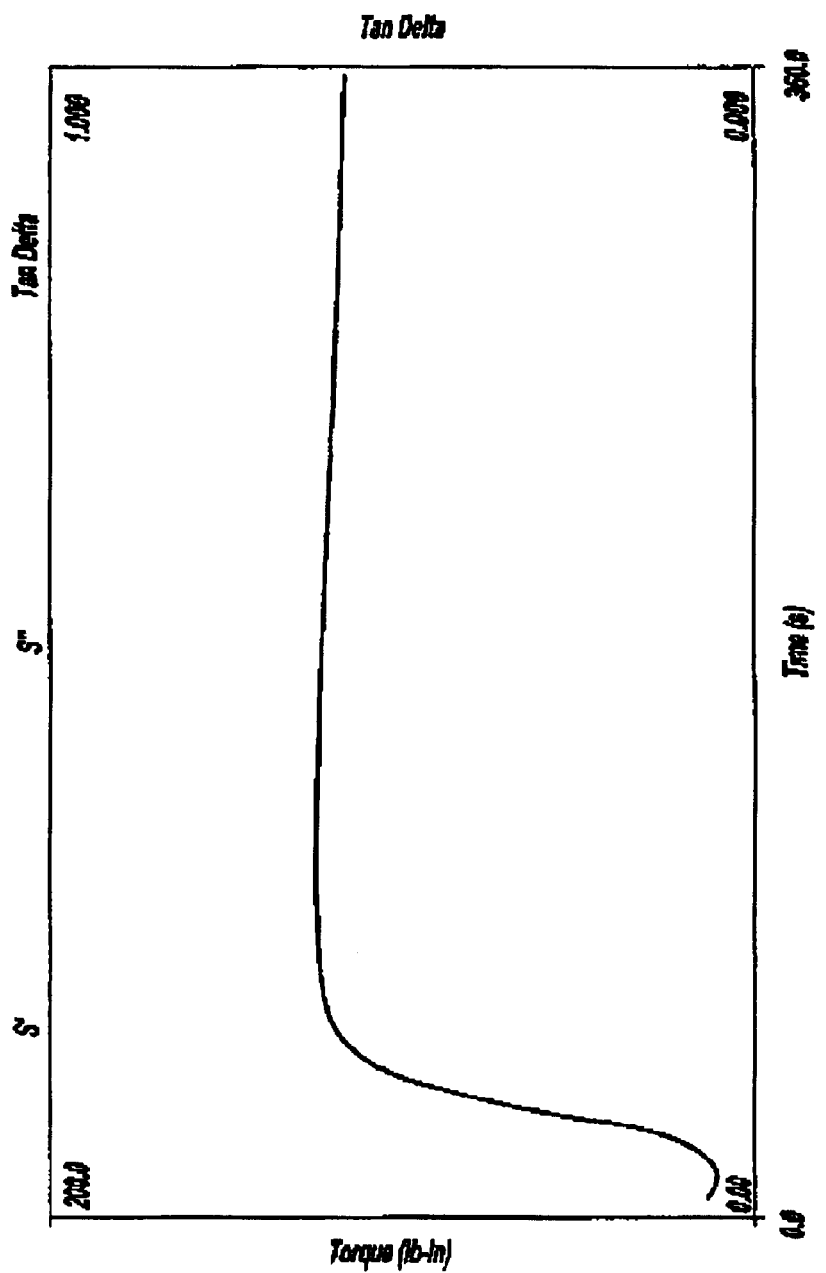
FIG. 5 shows a cure curve for Example 7, composition 111B, prepared in accordance with the present invention.
Figure 6:
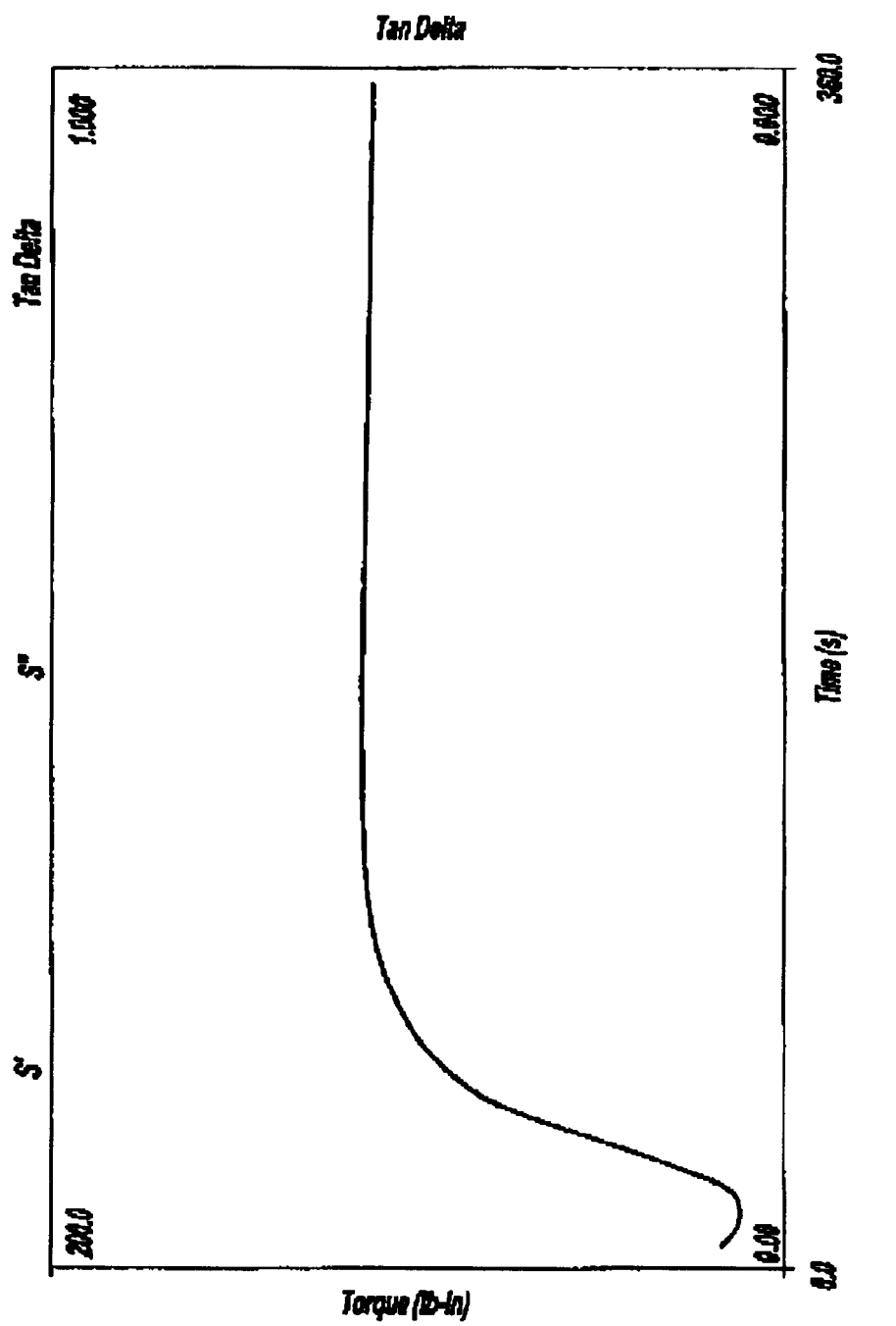
FIG. 6 shows a cure curve for Example 7, relative to composition 004A (state-of-the-art solid fluoroelastomer), as compared to composition 111B. Examples 3–6 are also cited by way of comparison.

Compositions of 111B and 004A were prepared as described in Example 1, and by methods known in the art, respectively. The mixtures were cured in a Rubber Processing Analyzer (RPA) or rheometer at 350° F. for six minutes, and evaluated to determine the minimum and maximum torque over the curing period. The times for completion of 2% of the cure, TS2.00, were also determined. With regard to composition 111B, the curve shown in FIG. 5 indicates the minimum and maximum torque after mixing to be 5.77 lb-in and 59.71 lb-in, respectively. The TS2.00 is 18.8 seconds. With regard to composition 004A, the curve shown in FIG. 6 indicates the minimum and maximum torque after mixing to be 9.74 lb-in and 123.86 lb-in, respectively. The TS2.00 is 15.5 seconds. The larger relative torques make processing more difficult, as is often the case with solid fluoroelastomers.

The tests indicated below were also conducted on the respective compositions:

| Original Properties | Test Method | 111B | 004A |
|---|---|---|---|
| Tensile Strength, MPa | ASTM D412, Die C | 9.6 | 10.28 |
| 50% Modulus, MPa | ASTM D412, Die C | 5.14 | 4.91 |
| 100% Modulus, MPa | ASTM D412, Die C | 7.85 | 7.29 |
| 200% Modulus, MPa | ASTM D412, Die C | 9.12 | 9.59 |
| Elongation, % | ASTM D412, Die C | 237 | 248 |
| Hardness, Shore A | ASTM D2240 | 80 | 80 |
| Specific Gravity | ASTM D792 | 1.93 | 1.92 |
| Compression Set, Method B, Plied Discs at 25% Deflection | ASTM D395 | | |
| 22 hrs @ 150° C. | | 9 | 12 |
| 70 hrs @ 150° C. | | 10 | 12 |
| Fluid Immersion in SF105G Oil (70 hrs @ 150° C.) | ASTM D471 | | |
| Change in tensile strength, % | | −9 | −26 |
| Change in elongation, % | | −41 | −37 |
| Change in hardness, pts | | 0 | 0 |
| Change in volume, % | | 0 | 1 |
| Fluid Immersion in 94% Anglamol + 6% Sturaco (70 hrs @ 150° C.) | ASTM D471 | | |
| Change in tensile strength, % | | −43 | −50 |
| Change in elongation, % | | −52 | −50 |
| Change in hardness, pts | | −2 | −2 |
| Change in volume, % | | 3 | 3 |

As shown from the data, compositions of this example exhibit acceptable volumetric swell at only 0–3% and also exhibit acceptable physical properties depending on their respective applications.

EXAMPLE 8

Comparative Example

Compositions of 017A, 017B and 017C were prepared as described in Example 1. The following tests were completed:

| Original Properties | Test Method | 017A | 017B | 017C |
|---|---|---|---|---|
| Tensile Strength, MPa | ASTM D412, Die C | 12.63 | 9.69 | 8.47 |
| 50% Modulus, MPa | ASTM D412, Die C | 2.53 | 2.33 | 2.54 |
| 100% Modulus, MPa | ASTM D412, Die C | 4.78 | 4.53 | 4.42 |
| 200% Modulus, MPa | ASTM D412, Die C | 8.97 | 7.64 | 7.30 |
| Elongation, % | ASTM D412, Die C | 291 | 252 | 261 |
| Hardness, Shore A | ASTM D2240 | 74 | 73 | 74 |
| Specific Gravity | ASTM D792 | 1.98 | 1.98 | 1.93 |
| Fluid Immersions: (94% Anglamol + 6% Sturaco) 168 hrs @ 150C | ASTM D471 | | | |
| Change in tensile strength, % | | 0 | −3 | −3 |
| Change in 50% Modulus, % | | −24 | −8 | 7 |
| Change in 100% Modulus, % | | −19 | −9 | 10 |
| Change in 200% Modulus, % | | −17 | −5 | 10 |
| Change in elongation, % | | 11 | 4 | −21 |
| Change in hardness, pts | | −3 | −1 | 0 |
| Change in volume, % | | 3 | 3 | 3 |
| Surface Appearance | | good | good | good |
| Fluid Immersions: (94% Anglamol + 6% Sturaco) 1008 hrs @ 150C | ASTM D471 | | | |
| Change in tensile strength, % | | −62 | −44 | −25 |
| Change in 50% Modulus, % | | −2 | 24 | 85 |
| Change in 100% Modulus, % | | −1 | 4 | na |
| Change in 200% Modulus, % | | na | na | na |
| Change in elongation, % | | −65 | −46 | −62 |
| Change in hardness, pts | | −2 | −1 | 2 |
| Change in volume, % | | 5 | 4 | 4 |
| Surface Appearance | | good | good | good |

As shown from the data, compositions of this example exhibit acceptable volumetric swell at only 3–5% and also exhibit acceptable physical properties depending on their respective applications.

EXAMPLE 9

Comparative Example

Figure 7:
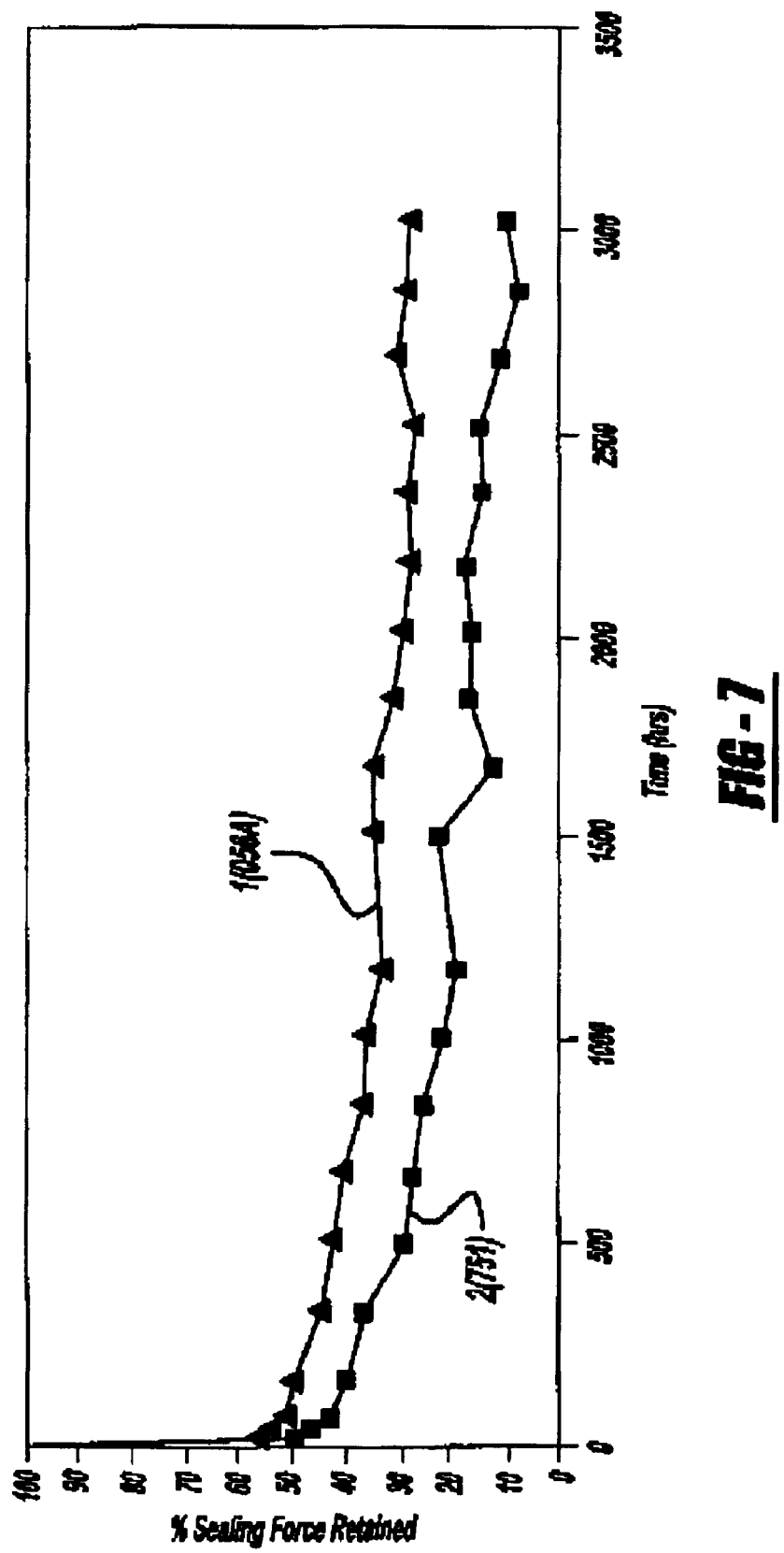
FIG. 7 illustrates the improved CSR effect of adding a liquid fluoroelastomer to a solid fluoroelastomer, in accordance with the present invention.

A composition of 056A was prepared as described in Example 1. Additionally, a state-of-the-art solid fluoroelastomer, 751, was prepared for comparative purposes by means known in the art. As shown in FIG. 7, curves 1 and 2 indicate the results of a CSR test on compositions 056A and 751, respectively. The compositions were cured and then subjected to the times shown in a bath of mineral oil at 150° C. The fluid was changed every 336 hours. CSR tests were completed as prescribed by ASTM-D6147–97, Method A. As shown by curve 1, 056A exhibits superior sealing properties over time as measured by the % sealing force retained. 751 on the other hand has a marked reduction in sealing force retained over time. Compositions made in accordance with the present invention, 056A for example, thus exhibit an improved integrity of the seals in a variety of environments, mineral oil in this case.

EXAMPLE 10

Comparative Example

Compositions of 056A and 038C were prepared as described in Example 1. Additionally, other state-of-the-art solid fluoroelastomers, 751 and 52-2, were prepared for comparative purposes by methods known in the art. As shown in FIG. 8, curves 3 and 4 indicate the results of a CSR test on compositions 056A and 038C, respectively. Curves 5 and 6 indicate the results of the CSR test on compositions 751 and 52-2, respectively. The compositions were cured and then subjected to the times shown in a bath of synthetic oil at 150° C. The fluid was changed every 336 hours. CSR tests were completed as prescribed by ASTM-D6147–97, Method A. As shown by curve 3, 056A in particular exhibits superior sealing properties over time as measured by the % sealing force retained. 751 and 52-2, on the other hand, have a marked reduction in sealing force retained over time. Compositions made in accordance with the present invention, 056A for example, thus exhibit an improved integrity of the seals in a variety of environments, synthetic oil in this case.

Compositions of the present invention can therefore be tailored for a wide variety of applications requiring higher or lower relative maximum torques and relatively longer TS2.00 times. These applications include gaskets and seals, rotating shaft seals, valve stem seals, O-rings, hoses, miscellaneous profiles and constructions, and thin gaskets having a thickness less than twenty thousandths of an inch, for example. Compositions of the present invention also exhibit enhanced fluid resistance and-optimum temperature properties, and, enhanced antioxidant and anti-ozonant properties. As indicated in Examples 7 and 8 the percent sealing force retained over time exhibited by compositions made in accordance with the present invention is improved as indicated by the compressive stress relaxation (CSR) tests illustrated. CSR tests measure the decline of rubber (responsive) force over time to compressive force.

In general, the present compositions can be tailored to exhibit increased TS2 time, a decreased viscosity, a decreased cure time (with the application of heat), an increased state of cure (or an increased crosslink density), and/or improved CSR characteristics. The various properties either alone or in combination with others indigenous to the present compositions result in liquid polymeric fluoroelastomers at room temperature. These properties enhance the industrial application by providing intricate injection profiles, screen intricate injection profiles, screen printed gaskets, robotically dispensed gaskets, thin layered gaskets, rubber coated metal by dip methods, and the ability to actually print gaskets through ink-jet printing.

The compositions of the present invention do not require high-pressure processes, four hundred ton presses for example, to produce useful articles. In fact, low-pressure processes include dipping methods, ink jet printing methods of producing a seal where a seal may be designed by computer and then "printed" onto a product, and others. For example, prior to curing a flowable completed mixture prepared as described in Example 1, the liquid/solid fluoroelastomer mixture can be injected into an ink jet printer. A predetermined design may then be computer programmed into the printer. The predetermined design can then be "printed" or dispensed on suitable substrate prior to or concurrently with the curing step thereby enabling the formation of thin gaskets of 0.015 inches or less, for example. The high energy costs and the high equipment capital costs can therefore be substantially reduced in accordance with the present invention.

Additionally, the present technology will facilitate the processing of formed-in-place gaskets and cured-in-place gaskets thereby eliminating the need to form the gaskets and then assemble them on the desired part interface. Certain steps in the manufacturing process of various parts requiring seals can therefore be eliminated thus reducing production costs.

Exemplary gaskets formed from the compositions of the present invention may be formed with a diameter as small as 0.0015 inches, much smaller than those formed from known in the art processes. For example, the gaskets may actually be designed by computer aided programs and then printed from printers containing "ink" cartridges filled with the present compositions. Other exemplary applications include liquid injection on T-shirts.

Finally, the fluid resistance of seals produced in accordance with the present invention is substantially improved over other seals now employed in the industry. As indicated in Examples 7 and 8 the percent sealing force retained over time exhibited by compositions made in accordance with the present invention is substantially improved as compared to conventional seals. As such, when compared to seals formed from silicone, the present compositions when used in injection processes result in improved injection seals in oil pumps, for example.

One of ordinary skill in the art will readily appreciate that the various amounts of the constituents described above can be varied to tailor the design properties of the polymeric or fluoroelastomeric compositions.

While the foregoing examples illustrate and describe the use of the present invention, they are not intended to limit the invention as disclosed in certain preferred embodiments herein. Therefore, variations and modifications commensurate with the above teachings and the skill and/or knowledge of the relevant art, are within the scope of the present invention.

We claim:

1. A fluoroelastomer composition comprising a mixture of:
   a peroxide-curable solid fluoroelastomer;
   a peroxide curative agent combined with the solid fluoroelastomer;
   a bisphenol-curable liquid fluoroelastomer; and
   a bisphenol curative agent combined with the liquid fluoroelastomer,
   wherein the solid fluoroelastomer and the peroxide curative are mixed together independently of the fluoroelastomer composition to form a first mixture, and the liquid fluoroelastomer and the bisphenol curative are mixed together independently of the fluoroelastomer composition to form a second mixture, and then said first and second mixtures are mixed together.

2. A fluoroelastomer composition comprising a mixture of:
   a peroxide-curable solid fluoroelastomer;
   a peroxide curative agent for curing the solid fluoroelastomer;
   a bisphenol-curable liquid fluoroelastomer; and
   a bisphenol curative agent for curing the liquid fluoroelastomer.

3. The composition of claim 2 containing 100 parts of a peroxide-curable solid fluoroelastomer terpolymer containing vinylidene difluoride, tetrafluoroethylene, and perfluoromethylvinylether at respective part ratios of 1–98%:1–98%:1–98%; 12.9 parts of a bisphenol-curable liquid fluoroelastomer copolymer containing vinylidene difluoride and hexafluoropropylene at respective parts ratios of 1–99%:1–99%; 2.58 parts of a bisphenol curative containing bisphenol AF at 0–90% and/or benzyltriphenylphosphonium at 10–100%; and 2.0 parts of a peroxide curative containing 2,5-dimethyl-2,5-di(t-butylperoxy)-3-hexyne.

4. The composition of claim 2 wherein said peroxide-curable solid fluoroelastomer is a copolymer formed from at least two comonomers selected from the group consisting of tetrafluoroethylene, chlorotrifluoroethylene, trifluoroethylene, vinyl fluoride, hexafluoropropylene, perfluoro(alkyl vinyl) ethers, perfluoro(alkoxy vinyl) ethers, perfluoro(alkoxyalkyl vinyl) ethers, ethylene, propylene, isobutylene, bromotrifluoroethylene, and 4-bromo-3,3,4,4-iodotetrafluorobutene.

5. The composition of claim 2, wherein said peroxide-curable solid fluoroelastomer is selected from at least one copolymer or terpolymer selected from the group consisting of vinylidene difluoride/tetrafluoroethylene/propylene terpolymers, vinylidene difluoride/tetrafluoroethylene/perfluoro(alkyl vinyl) ether terpolymers, vinylidene difluoride/hexafluoropropylene dipolymers, and vinylidene fluoride/hexafluoropropylene/tetrafluoroethylene terpolymers.

6. The fluoroelastomer composition of claim 2 wherein said peroxide-curable solid fluoroelastomer is a vinylidene difluoride/hexafluoropropylene/tetrafluoroethylene terpolymer comprising 20–70 wt. % vinylidene difluoride, 20–60 wt. % hexafluoropropylene, and 0–40 wt. % tetrafluoroethylene.

7. The composition of claim 2 wherein said bisphenol-curable liquid fluoroelastomer is selected from the group consisting of liquid fluoroelastomers having a molecular weight of 500 to 20,000.

8. The composition of claim 2 wherein said bisphenol-curable liquid fluoroelastomer is selected from the group consisting of vinylidene difluoride/hexafluoropropylene elastomers and vinylidene difluoride/hexafluoropropylene/tetrafluoroethylene elastomers.

9. The composition of claim 2 wherein said bisphenol curative is selected from the group consisting of 4,4'-hexafluoroisopropylidene diphenol, hexafluoroisopropylidene-bis(4-hydroxybenzene), 4,4'-isopropylidene diphenol, 4,4'-dihydroxydiphenyl sulfone, diaminobisphenol AF, bisphenolate salts, and dipotassium salt of bisphenol AF.

10. The composition of claim 2 wherein said bisphenol curative is represented by the formula

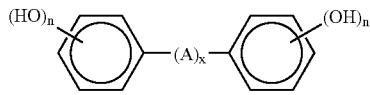

where A is a difunctional aliphatic, cycloaliphatic, or aromatic radical of 1–13 carbon atoms, or a thio, oxy, carbonyl, sulfinyl, or sulfonyl radical; x is 0 or 1; and n is 1 or 2.

11. The composition of claim 10 wherein A is substituted with at least one chlorine or fluorine atom.

12. The composition of claim 10 wherein at least one aromatic ring of the bisphenol curative is substituted with a chlorine or fluorine atom, an amino group, a —CHO group, or a carboxyl or acyl radical.

13. The composition of claim 10 wherein A is selected from the group consisting of (1) alkylenes selected from the group consisting of methylene, ethylene, chloroethylene, fluoroethylene, difluoroethylene, propylidene, isopropylidene, tributylidene, heptachlorobutylidene, heptafluorobutylidene, pentylidene, hexylidene, and 1,1-cyclohexylidene; (2) a cycloalkylene radical selected from the group consisting of 1,4-cyclohexylene, 2-chloro-1,4-cyclohexylene, cyclopentylene, and 2-fluoro-1,4-cyclohexylene; and (3) an arylene radical selected from the group consisting of m-phenylene, p-phenylene, o-phenylene, methyphenylene, dimethylphenylene, 1,4-naphthylene, 3-fluoro-1,4-naphthylene, and 2,6-naphthylene.

14. The composition of claim 2 wherein the bisphenol curative is employed at 0.1–15 parts per 100 parts of liquid fluoroelastomer.

15. The composition of claim 2 wherein the part ratio of the solid fluoroelastomer to the liquid fluoroelastomer is 95:5 to 20:80.

16. The composition of claim 2 wherein the part ratio of the solid fluoroelastomer and the liquid fluoroelastomer is 95:5 to 30:70.

17. The composition of claim 2 wherein the peroxide curative is selected from the group consisting of dialkyl peroxides and di-t-butyl peroxide having a tertiary carbon atom attached to a peroxy oxygen.

18. The composition of claim 2 wherein the peroxide curative is selected from the group consisting of 2,5-dimethyl-2,5-di(t-butylperoxy)hexane-3, 2,5-dimethyl-2,5-di(t-butylperoxy)hexane, dicumyl peroxide, dibenzoyl peroxide, t-butyl perbenzoate, and di[1,3-dimethyl-3-(t-butylperoxy)butyl]carbonate.

19. The composition of claim 2 wherein said peroxide is used in an amount of about 0.1–15 parts per 100 parts of solid fluoroelastomer.

20. The composition of claim 2 wherein said peroxide-curable solid fluoroelastomer is a terpolymer containing up to 100 parts and consisting essentially of ethylene, tetrafluoroethylene, and perfluoro($C_1$–$C_3$)-alkylvinylether in a parts ratio of 1–98 parts: 1–98 parts: 1–98 parts for each respective comonomer.

21. The composition of claim 20 wherein said terpolymer consists essentially of ethylene. tetrafluoroethylene, and perfluoromethylvinylether.

22. The composition of claim 2 wherein said bisphenol-curable liquid fluoroelastomer is a copolymer containing up to 100 parts and consisting essentially of vinylidene difluoride and hexafluoropropylene in a parts ratio of 1–99 parts:1–99 parts for each respective comonomer.

23. The composition of claim 2 wherein said bisphenol curative agent is hexafluoroisopropylidene-bis(4-hydroxybenzene).

24. The composition of claim 2 wherein said peroxide curative agent is 2,5-dimethyl-2,5-di(t-butylperoxy)-3-hexyne.

25. A method of forming a solid fluoroelastomer article comprising the steps of:
mixing a peroxide-curable solid fluoroelastomer with a peroxide curative agent to form a first mixture;
mixing a bisphenol-curable liquid fluoroelastomer with a bisphenol curative agent to form a second mixture;
mixing the first mixture and second mixture to form a third mixture; and curing the third mixture to activate a dual cure system incorporating a peroxide cure and a bisphenol cure, wherein the curing step is conducted at a temperature and for a time sufficient to cure the third mixture and form a solid fluoroelastomer.

26. The method of claim 25 further comprising the steps of:
injecting the third mixture into an ink jet printer prior to the curing step; programming a predetermined design into the printer prior to the curing step; and
printing the predetermined design prior to or concurrently with the curing step.

27. A method of mixing a fluoroelastomeric composition comprising the steps of:
placing a predetermined amount of peroxide-curable solid fluoroelastomer within a mixing vessel at least at room temperature and beating until the solid fluoroelastomer is soft and fragmented into particles;

adding at least one filler into the vessel and continuing to mix;

adding a peroxide curative agent into the vessel and continuing to mix;

adding a bisphenol curative agent into the vessel and continuing to mix;

adding a coagent into the vessel for linking the materials and continuing to mix; and adding a bisphenol-curable liquid fluoroelastomer into the vessel and continuing to mix at least until a homogeneous solution is formed, wherein the peroxide curative agent is added in an amount effective to cure the solid fluoroelastomer at about 350° F. and the bisphenol curative agent is added in an amount effective to cure the liquid fluoroelastomer at about 350° F., and, the solid fluoroelastomer is added with respect to the liquid fluoroelastomer in a parts ratio range of 1:99 to 99:1 per 100 parts of total fluoroelastomer.

28. A product formed from the method of claim 25.
29. An article formed from the composition of claim 1.
30. A fluoroelastomer composition comprising a mixture of:

a peroxide-curable solid fluoroelastomeric terpolymer containing vinylidene difluoride, tetrafluoroethylene, and perfluoromethylvinylether at respective part ratios of 1–98%:1–98%:1–98%;

a peroxide curative agent consisting essentially of 2,5-dimethyl-2,5-di(t-butylperoxy)-3-hexyne;

a bisphenol-curable liquid fluoroelastomeric copolymer containing vinylidene difluoride and hexafluoropropylene at respective parts ratios of 1–99%:1–99%; and hexafluoroisopropylidene-bis(4-hydroxybenzene) as a bisphenol curative agent.

31. A seal formed from curing a mixture comprising:

about 100 parts of a peroxide curable solid fluoroelastomer;

0.1–25 parts of a peroxide curative;

0.1–200 parts of a bisphenol-curable liquid fluoroelastomer;

0.1–25 parts of magnesium oxide;

0.1–25 parts of a bisphenol curative;

0.1–50 parts of carbon black; and 0.1–25 parts of calcium hydroxide.

32. A seal formed from curing a mixture comprising:

about 100 parts of a solid peroxide curable fluoroelastomer;

0.1–20 parts of a peroxide curative;

0.1–120 parts of a bisphenol-curable liquid fluoroelastomer;

0.1–20 parts of magnesium oxide;

0.1–20 parts of a bisphenol curative;

0.1–10 parts of carbon black; and 0.1–20 parts of calcium hydroxide.

33. A seal formed from curing a mixture comprising:

about 100 parts of a peroxide curable solid fluoroelastomer;

about 2.0 parts of a peroxide curative;

12.9 parts of a bisphenol-curable liquid fluoroelastomer;

1.55 parts of magnesium oxide;

1.55 parts of a bisphenol curative;

2.58 parts of carbon black; and 1.55 parts of calcium hydroxide.

34. A fluoroelastomer seal composition comprising a mixture of:

a peroxide-curable solid fluoroelastomer;

a peroxide curative agent combined with the solid fluoroelastomer;

a bisphenol-curable liquid fluoroelastomer; and a bisphenol curative agent combined with the liquid fluoroelastomer, wherein the solid fluoroelastomer and the peroxide curative are mixed together independently of the fluoroelastomer composition to form a first mixture, and the liquid fluoroelastomer and the peroxide curative are mixed together independently of the fluoroelastomer composition to form a second mixture, and then said first and second mixtures are mixed together.

35. A fluoroelastomer seal composition comprising a mixture of:

a peroxide-curable solid fluoroelastomer;

a peroxide curative agent for curing the solid fluoroelastomer;

a bisphenol-curable liquid fluoroelastomer; and a bisphenol curative agent for curing the liquid fluoroelastomer.

36. The seal composition of claim 35 containing 100 parts of a peroxide-curable solid fluoroelastomer terpolymer containing vinylidene difluoride, tetrafluoroethylene, and perfluoromethylvinylether at respective part ratios of 1–98%:1–98%:1–98%; 12.9 parts of a bisphenol-curable liquid fluoroelastomer copolymer containing vinylidene difluoride and hexafluoropropylene at respective parts ratios of 1–99%:1–99%; 2.58 parts of a bisphenol curative containing bisphenol AF at 0–90% and/or benzyltriphenylphosphonium at 10–100%; and 2.0 parts of a peroxide curative containing 2,5-dimethyl-2,5-di(t-butylperoxy)-3-hexyne.

37. The seal composition of claim 36 wherein said peroxide-curable solid fluoroelastomer is a copolymer formed from at least two comonomers selected from the group consisting of tetrafluoroethylene, chlorotrifluoroethylene, trifluoroethylene, vinyl fluoride, hexafluoropropylene, perfluoro(alkyl vinyl) ethers, perfluoro(alkoxy vinyl) ethers, perfluoro(alkoxyalkyl vinyl) ethers, ethylene, propylene, isobutylene, bromotrifluoroethylene, 4-bromo-3,3,4,4-iodotetrafluorobutene.

38. The seal composition of claim 37 wherein said peroxide-curable solid fluoroelastomer is a vinylidene difluoride/hexafluoropropylene/tetrafluoroethylene terpolymer comprising 20–70 wt. % vinylidene difluoride, 20–60 wt. % hexafluoropropylene, and 0–40 wt. % tetrafluoroethylene.

39. The seal composition of claim 38 wherein said bisphenol-curable liquid fluoroelastomer is selected from the group consisting of liquid fluoroelastomers having a molecular weight of 500 to 20,000.

40. The composition of claim 39 wherein said bisphenol curative is represented by the formula

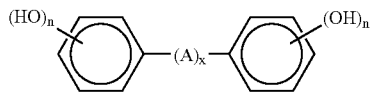

where A is a difunctional aliphatic, cycloaliphatic, or aromatic radical of 1–13 carbon atoms, or a thio, oxy, carbonyl, sulfinyl, or sulfonyl radical; x is 0 or 1; and n is 1 or 2.

41. The composition of claim 40 wherein A is substituted with at least one chlorine or fluorine atom.

42. The composition of claim 41 wherein at least one aromatic ring of the bisphenol curative is substituted with a chlorine or fluorine atom, an amino group, a —CHO group, or a carboxyl or acyl radical.

43. The composition of claim 42 wherein the bisphenol curative is employed at 0.1–15 parts per 100 parts of liquid fluoroelastomer.

44. The composition of claim 43 wherein the part ratio of the solid fluoroelastomer and the liquid fluoroelastomer is 95:5 to 30:70.

45. A method of mixing a fluoroelastomeric seal composition comprising the steps of:
placing a predetermined amount of peroxide-curable solid fluoroelastomer within a mixing vessel at least at room temperature and beating until the solid fluoroelastomer is soft and fragmented into particles; adding at least one filler into the vessel and continuing to mix;
adding a peroxide curative agent into the vessel and continuing to mix; adding a bisphenol curative agent into the vessel and continuing to mix; adding a coagent into the vessel for linking the materials and continuing to mix; and
adding a bisphenol-curable liquid fluoroelastomer into the vessel and continuing to mix at least until a homogeneous mixture is formed, wherein the peroxide curative agent is added in an amount effective to cure the solid fluoroelastomer at about 350° F. and the bisphenol curative agent is added in an amount effective to cure the liquid fluoroelastomer at about 350° F., and, the solid fluoroelastomer is added with respect to the liquid fluoroelastomer in a parts ratio range of 1:99 to 99:1 per 100 parts of total fluoroelastomer.

46. A product formed from the method of claim 45.

47. A method of forming a solid fluoroelastomer seal article comprising the steps of:
mixing a peroxide-curable solid fluoroelastomer with a peroxide curative agent to form a first mixture;
mixing a bisphenol-curable liquid fluoroelastomer with a bisphenol curative to form a second mixture;
mixing the first mixture and second mixture to form a third mixture; and
curing the third mixture to activate a dual cure system incorporating a peroxide cure and a bisphenol cure, wherein the curing step is conducted at a temperature and for in a time sufficient to cure the third mixture and form a solid fluoroelastomer.

48. The method of claim 47 further comprising the steps of:
injecting the third mixture into an ink jet printer prior to the curing step;
programming a predetermined design into the printer prior to the curing step; and
printing the predetermined design prior to or concurrently with the curing step.

49. A product formed from the method of claim 48.

50. A seal particle formed from the composition of claim 34.

51. A new method according to claim 47, wherein said perioxide- curable solid fluoroelastomer is a copolymer formed from at least two comonomers selected from the group consisting of tetrafluoroethylene, chlorotrifluoroethylene, trifluoroethylene, vinyl fluoride, heafluoropropylene, perfluoro(alkyl vinyl) ethers, perfluoro(alkoxy vinyl) ethers, perfluoro(alkoxyalkyl vinyl) ethers, ethylene, propylene, isobutylene, bromotrifluoroethylene, and 4- bromo-3,3,4,4-iodotetrafluorobutene.

52. A method according to claim 47, wherein said peroxide- curable solid fluoroelastomer is selected from at least one copolymer or terpolymer selected from the group consisting of vinylidene difluoride/tetrafluoroethylene/propylene terpolymers, vinylidene difluoride/tetrafluoroethylene/perfluoro(alkyl vinyl) ether terpolymers, vinylidene difluoride/hexafluoropropylene dopolymers, and vinylidene fluoride/hexafluoropropylene/tetrafluoroethylene terpolymers.

53. A method according to claim 47, wherein said peroxide- curable solid fluoroelastomer is in vinylidene difluoride/hexafluoroproylene/tetrafluoroethylene terpolymer comprising 20–70 wt.% vinylidene difluoride 20 –60 wt.% hexafluoropropylene, and 0–40 wt.%tetrafluoroethylene.

54. A method according to claim 47, wherein the bisphenol- curable liquid fluoroelastomer is selected from the group consisting of liquid fluoroblastomer having a molecular weight of 500 to 20,000.

55. A method according to claim 47, wherein said bisphenol-curable liquid fluoroelastomer is selected from the group consisting of vinylidene difluoride/hexafluoropropylene elastomer and vinylidene difluoride/hexafluoropropylene/tetrafluoroethylene elastomers.

56. A method according to claim 47, wherein said biphenol curative is selected from the group consisting of 4,4'-hexafluoroisopropylidene diphenol, hexafluoroisopropylidene-bis(4-hydroxybenzene), 4,4'-isopropylidene diphenol, 4,4'- dihydroxydiphenyl sulfone, diaminobisphenol AF, bisphenolate salts, and dipotassium salt of biphenol AF.

57. A method according to claim 47, wherein said biphenol curative is represented by the formula

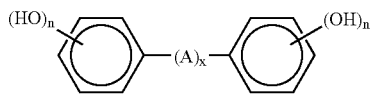

where A is a difunctional aliphatic, cycloaliphatic, or aromatic radical of 1–13 carbon atoms, or a thio, oxy, carbonyl, sulfinyl, or sulfonyl radical,; x is 0 or 1; n is 1 or 2.

58. A method according to claim 57, wherein A is substituted with at least one chlorine or fluorine atom.

59. A method accordingto claim 57, wherein at least one aromatic ring of the biphenol curative is substituted with a chlorine or fluorine atom, an amino group, a - CHO group, or a carboxyl or acyl radical.

60. A method according to claim 57, wherein A is selectedd from the group consisting of (1) alkylenes selected from the group consisting of methylene, ethylene, chloroethylene, fluoroethylene, difluoroethylene, propylidene, isopropylidene, tributylidene, hepatchlorobutylidene, heptafluorobutylidene, pentylidene, hexylidene, and 1,1-cyclohexylidene; (2) a cycloalkylene radical selected from the group consistin of 1,4-cyclohexylene, 2-chloro-1,4-cyclohexylene, yclopentylene, and 2-fluoro-1,4- cyclohexylene; and (3) an arylene radical selected from the group consisting of m- phenylene, p-phenylene, o-phenylene, methyphenylene, dimethylphenylene, 1,4- naphthylene, 4-fluoro-1,4naphthylene, and 2,6-naphthylene.

61. A method according to claim 47, wherein the bisphenol curative is employed at 0.1–15 parts per 100 parts of liquid fluoroelastomer.

62. A methof according to claim 47, wherein the part ratio of the solid fluoroelastomer to the liquid fluoroelastomer is 95:5 to 20:80.

63. A method according to claim 47, wherein the part ratio of the solid fluoroelastomer and the liquid fluoroelastomer is 95:5 to 30:70.

64. A method according to claim 47, wherein the peroxide curative is selected from the group consisting of dialkyl peroxides and di-t-butyl peroxide having a tertiary carbon atom attached to a peroxy oxygen.

65. A method according to claim 47, wherein the peroxide curative is selected from the group consisting of 2,5-dimethyl-2,5-di(t-butylperoxy)hexane-3, 2,5- dimethyl-2,5-di(t-butylperoxy)hexane, dicumyl peroxide, dibenzoyl peroxide, t-butyl perbenzoate, and di[(1,3-dimethyl-3-(t-butylperoxy)peroxy)butyl]carbonate.

66. A method according to claim 47, wherein said peroxide is used in an amount of about 0.1-15 parts per 100 parts of solid fluoroblastomer.

67. A method according to claim 47, wherein said peroxide-curable solid fluroelastomer is a terpolymer containing up to 100 parts and consisting essentially of ethylene, tetrafluoroethylene, and perfluoro($C_1C_3$) -alkylvinylether in a parts ration of 1–98 parts: 1–98 parts for each respective comonomer.

68. A method according to claim 67, wherein said terpolymer consists essentially of ethylene, tetrafluoroethylene, and perfluoromethylvinylether.

69. A method according to claim 47, wherein said bisphenol-curable liquid fluroelastomer is a copolymer containing up to 100 parts and consisting essentially of vinylidene difluoride and hexafluoropropylene in a parts ratio of 100–99 parts: 1–99 parts for each respective comonomer.

70. A method according to claim 47, wherein said bisphenol curative agent is hexafluoroisopropylidene-bis(4-hydroxybenzene).

71. A method according to claim 47, wherein said bisphenol curative agent is hexafluoroisopropylidene-bis(4-hydroxybenzene).

72. A method of forming a solid fluoroelastomer article by ink-jet printing, comprising
mixing a peroxide curable solid fluoroelastomer with a peroxide curative agent at a temperature below that at which significant amounts of crosslinks are formed to form a first mixture;
mixing a bisphenol curable liquid fluoroelastomer with a bisphenol curative agent to form a second mixture;
mixing a first mixture and second mixture together to form a third mixture; and curing the third mixture to active to a dual cure system incorporating a peroxide cure and a bisphenol cure, and further comprising
injecting the third mixture into an ink jet printer prior to the curing steps;

programming a predetermined design into the printer prior to the cutting steps;
and
printing the predetermined design prior to or concurrently with the curing step.

73. A method according to claim 72, wherein the solid fluoroelastomer comprises a solid gum comprising vinylidene fluoride and at least one other fluorinated comonomer.

74. A method according to claim 73, wherein the at least one other fluorinated comonomer is selected from the group consisting of perfluoroalkylvinylethers, perfluoromethylvinylether, tetrafluoroethylene, chlorotrifluoroethylene, trifluoroethylene, vinyl fluoride, hexafluoropropylene, perfluoro(alkoxyalkylvinyl)ethers, ethylene, propylene, isobutylene, bromotrifluoroethylene, fluorbromo-3,3,4,4-tetrafluorobutene-1, bromoperfluoro (ethylvinyl)ether, and iodotetrafluorobutene.

75. A method according to claim 74, wherein at least one other fluorinated monomer comprises tetrafluoroethylene, propylene, hexafluoropropylene, or perfluoro(methylvinyl) ether.

76. A method according to claim 72, wherein the solid elastomer comprises a copolymer selected from th group consisting of vinylidene difluoride/tetrafluoroethylene/ propylene terpolymers, vinylidene difluoride/ tetrafluoroethylene/perfluoroalkylvinylether ter polymers, ethylene/terafluoroethylene/propylene terpolymers, tetrafluoroethylene propylene dipolymers, vinyldene difluoride/hexafluoropropylene dipolymers, and vinylidene fluoride/hexafluoropropylene/tetrafluoroethylene terpolymers.

77. A method according to claim 76, wherein the copolymers further comprise a cure site monomer.

78. A method according to claim 72, wherein said bisphenol-curable liquid fluoroelastomer is selected from the group consisting of liquid fluoroelastomers having a molecular weight of 500 to 20,000.

79. A method according to claim 72, wherein said bisphenol-curable liquid fluoroelastomer is selected from the group consisting of vinylidene difluoride/ hexafluoropropylene elastomers and vinylidene difluoride/ hexafluoropropylene/tetrafluoroethylene elastomers.

80. A method according to claim 72, wherein said bisphenol curative is selected from the group consisting of 4,4'-hexafluoroisopropylidene diphenol, hexafluoroisopropylidene-bis(4-hydroxybenzene), 4,4'-isopropylidene diphenol, 4,4'- dihydroxydiphenyl sulfone, diaminobisphenol AF, bisphenolate salts, and dipotassium salt of bisphenol AF.

81. A method according to claim 72, wherein said biphenol curative is represented by the formula

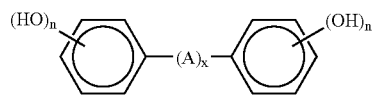

where A is a difunctional aliphatic, cycloaliphatic, or aromatic radical 1–13 carbon atoms, or a thio, oxy, carbonyl, sulfinyl, or sulfonyl radical; —is 0 or 1 ; and n is 1 or 2.

82. A method according to claim 72, wherein A is substituted with at least one chlorine or fluorine atom.

83. A method according to claim 72, wherein at least one aromatic ring of the bisphenl curative is substituted with a chlorine of fluorin atom, an amino group, a- CHO group, or a carboxyl or acyl radical.

84. A method according to claim 72, wherein A is selected from the group consisting of (1) alkylenes selected from the group consisting of methylene, ethylene, chlorothylene, fluoroethylene, difluoroethylene, propylidene, isopropylidene, tributylidene, heptachlorobutylidene, hepatafluorobutylidene, pentylidene, hexylidene, and 1,1-cyclohexylidene; (2) a cycloalkylene radical selected from the group consisting of 1,4-cyclohexylene, 2-chloro1,4-cylohexylene, cyclopentylene, and 2-fluoro-1,4- cyclohexylene; and (3) an arylene radical selected from the group consisting of m- phenylene, p-phenylene, o-phenylene, methyphenylene, dimethylphenylene, 1,4- naphthylene, 3-fluoro-1,4-naphthylene, and 2,6-naphthylene.

85. A method according to claim 72 wherein the bisphenol curative is employed at 0.1–15 parts per 100 of liquid fluoroelastomer.

86. A method according to claim 72 wherein the part ratio of the solid fluoroelastomer to the liquid fluoroelastomer is 95:5 to 20:80.

87. The method of claim 25, wherein the mixing steps are carried out at room temperature to 100 ° F. and the curing is carried out at room temperature to 350 ° F.

88. The method of claim 47, wherein the mixing steps are carried out at room temperature to 100 ° F. and the curing is carried out at room temperature to 350 ° F.

* * * * *

UNITED STATES PATENT AND TRADEMARK OFFICE
CERTIFICATE OF CORRECTION

PATENT NO. : 7,098,270 B2  Page 1 of 1
APPLICATION NO. : 10/238425
DATED : August 29, 2006
INVENTOR(S) : Paul J. Hochgesang, James W. Jacks and Francis Joseph Walker It is certified that error appears in the above-identified patent and that said Letters Patent is hereby corrected as shown below:

Add -- Francis Joseph Walker -- as an inventor to the above-referenced issued patent.

Signed and Sealed this

Sixth Day of March, 2007

JON W. DUDAS
*Director of the United States Patent and Trademark Office*